US008778590B2

(12) United States Patent
Callant

(10) Patent No.: US 8,778,590 B2
(45) Date of Patent: *Jul. 15, 2014

(54) LITHOGRAPHIC PRINTING PLATE PRECURSOR

(75) Inventor: Paul Callant, Edegem (BE)

(73) Assignee: Agfa Graphics NV, Mortsel (BE)

( * ) Notice: Subject to any disclaimer, the term of this patent is extended or adjusted under 35 U.S.C. 154(b) by 46 days.

This patent is subject to a terminal disclaimer.

(21) Appl. No.: 13/121,658

(22) PCT Filed: Dec. 3, 2009

(86) PCT No.: PCT/EP2009/066333
§ 371 (c)(1),
(2), (4) Date: Jul. 6, 2011

(87) PCT Pub. No.: WO2010/079020
PCT Pub. Date: Jul. 15, 2010

(65) Prior Publication Data
US 2011/0287364 A1 Nov. 24, 2011

Related U.S. Application Data

(60) Provisional application No. 61/138,956, filed on Dec. 19, 2008.

(30) Foreign Application Priority Data

Dec. 18, 2008 (EP) .................... 08172137

(51) Int. Cl.
B41F 7/00 (2006.01)
B41M 5/00 (2006.01)
B41N 1/00 (2006.01)
G03F 7/00 (2006.01)
G03F 7/26 (2006.01)

(52) U.S. Cl.
USPC ............. 430/270.1; 430/270.2; 430/294; 430/296; 430/302; 430/309; 101/450.1; 101/453; 101/463.1

(58) Field of Classification Search
USPC .......... 430/270.1, 302; 101/450.1, 453, 463.1
See application file for complete search history.

(56) References Cited

U.S. PATENT DOCUMENTS 3,476,937 A 11/1969 Vrancken
3,971,660 A 7/1976 Staehle
(Continued)

FOREIGN PATENT DOCUMENTS

EP 0556690 A1 8/1993
EP 0601240 A1 6/1994
(Continued)

OTHER PUBLICATIONS

European Search Report issued in European Application No. EP 08172137.5, dated Mar. 27, 2009.
(Continued)

Primary Examiner — Chanceity Robinson
(74) Attorney, Agent, or Firm — Leydig, Voit & Mayer, Ltd.

(57) ABSTRACT

A lithographic printing plate precursor comprising a coating provided on a support having a hydrophilic surface, the coating containing thermoplastic polymer particles and an IR-dye characterized in that the IR-dye contains a structural element according to Formula I Formula I

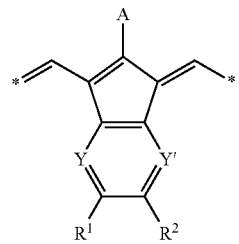

wherein
A represents hydrogen, halogen or a monovalent organic group;
Y and Y' independently represent —CH— or —N—;
$R^1$ and $R^2$ independently represent hydrogen, an optionally substituted alkyl or aryl group or represent the necessary atoms to form a ring;
* represents the linking positions to the rest of the molecule.

15 Claims, 3 Drawing Sheets

DRS spectra of PPP-01

(56) References Cited

U.S. PATENT DOCUMENTS

| | | | |
|---|---|---|---|
| 4,045,232 | A | 8/1977 | Parkinson |
| 4,284,705 | A | 8/1981 | Phlipot et al. |
| 4,917,977 | A * | 4/1990 | Smothers .................. 430/1 |
| 4,981,517 | A | 1/1991 | DeSanto, Jr. et al. |
| 5,032,196 | A | 7/1991 | Masumoto et al. |
| 5,250,214 | A | 10/1993 | Kanemoto et al. |
| 5,288,344 | A | 2/1994 | Peker et al. |
| 5,368,659 | A | 11/1994 | Peker et al. |
| 5,618,359 | A | 4/1997 | Lin et al. |
| 5,735,975 | A | 4/1998 | Lin et al. |
| 6,140,392 | A | 10/2000 | Kingman et al. |
| 6,325,868 | B1 | 12/2001 | Kim et al. |
| 6,692,890 | B2 | 2/2004 | Huang et al. |
| 6,818,078 | B2 | 11/2004 | Kim et al. |
| 6,912,956 | B2 | 7/2005 | Mori |
| 2006/0019196 | A1 | 1/2006 | Miyoshi |
| 2007/0184387 | A1 | 8/2007 | Inno |
| 2011/0165518 | A1 | 7/2011 | Callant et al. |

FOREIGN PATENT DOCUMENTS

| | | | |
|---|---|---|---|
| EP | 0770494 A2 | 5/1997 | |
| EP | 0770495 A1 | 5/1997 | |
| EP | 0770496 A1 | 5/1997 | |
| EP | 0770497 A1 | 5/1997 | |
| EP | 1142707 A1 | 10/2001 | |
| EP | 1157829 A1 | 11/2001 | |
| EP | 1217010 A1 | 6/2002 | |
| EP | 1356926 A1 | 10/2003 | |
| EP | 1564020 A1 | 8/2005 | |
| EP | 1 342 568 B1 | 10/2005 | |
| EP | 1614538 A2 | 1/2006 | |
| EP | 1621339 A1 | 2/2006 | |
| EP | 1 767 353 A2 | 3/2007 | |
| EP | 1767349 A1 | 3/2007 | |
| EP | 1834764 A1 | 9/2007 | |
| EP | 1 736 312 B1 | 4/2008 | |
| EP | 1914069 A1 | 4/2008 | |
| EP | 1 614 539 B1 | 9/2008 | |
| EP | 1 614 540 B1 | 9/2008 | |
| EP | 1972461 A1 | 9/2008 | |
| EP | 1974911 A1 | 10/2008 | |
| EP | 1974912 A1 | 10/2008 | |
| EP | 2095948 A1 | 9/2009 | |
| EP | 1 859 935 B1 | 11/2009 | |
| EP | 1 859 936 B1 | 11/2009 | |
| FR | 2300354 A1 | 9/1976 | |
| GB | 1419512 | 12/1975 | |
| WO | WO 00/32705 | 6/2000 | |
| WO | WO 2005/111727 A1 | 11/2005 | |
| WO | WO 2006/005688 A1 | 1/2006 | |
| WO | WO 2006005688 A1 * | 1/2006 | |
| WO | WO 2006/037716 A1 | 4/2006 | |
| WO | WO 2006/136543 A2 | 12/2006 | |
| WO | WO 2007/045515 A1 | 4/2007 | |
| WO | WO 2007148621 A1 * | 12/2007 | |
| WO | WO 2008/138942 A1 | 11/2008 | |

OTHER PUBLICATIONS

International Search Report issued in PCT Application No. PCT/EP09/66333, dated May 12, 2010.

International Search Report in corresponding International Application No. PCT/EP2009/066333, mailed May 12, 2010.

International Preliminary Report on Patentability in corresponding International Application No. PCT/EP2009/066333, mailed Jun. 21, 2011.

* cited by examiner

Figure 1: DRS spectra of PPP-01
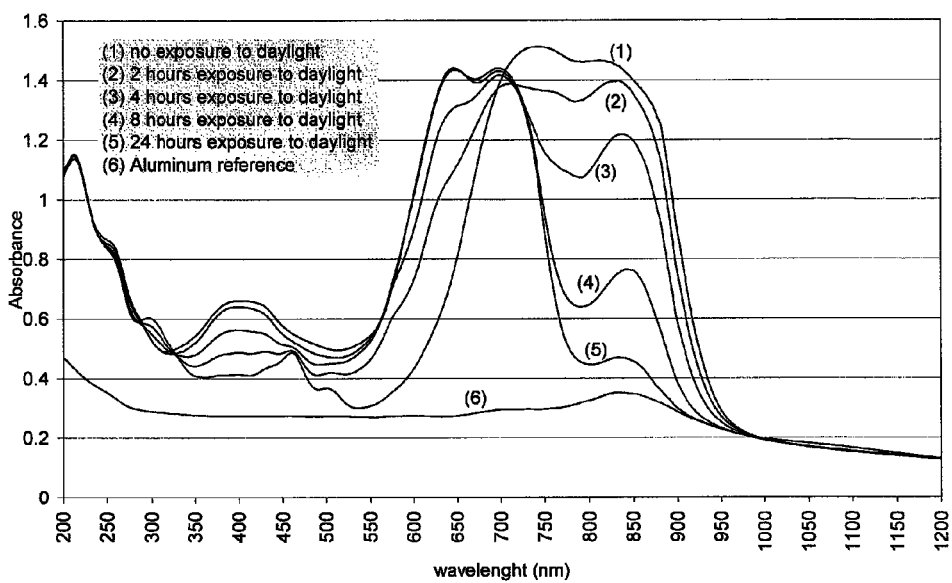
Figure 2: DRS spectra of PPP-02
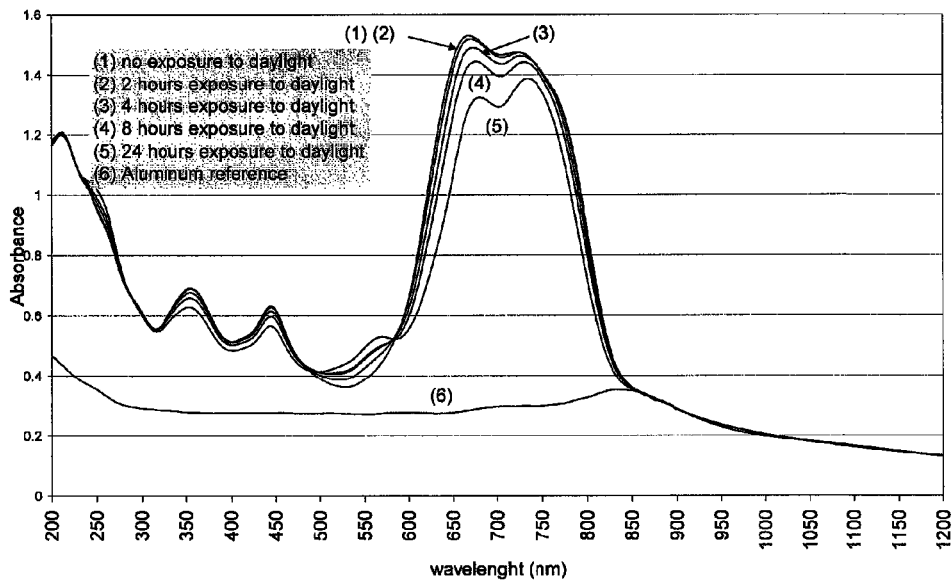

Figure 3: DRS spectra of PPP-09
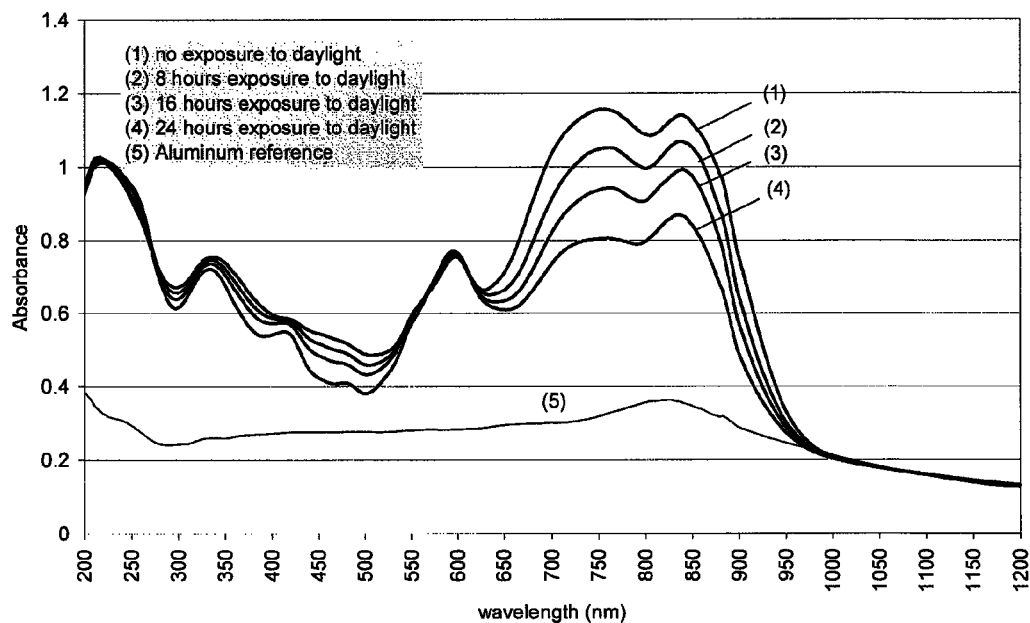
Figure 4: DRS spectra of PPP-14
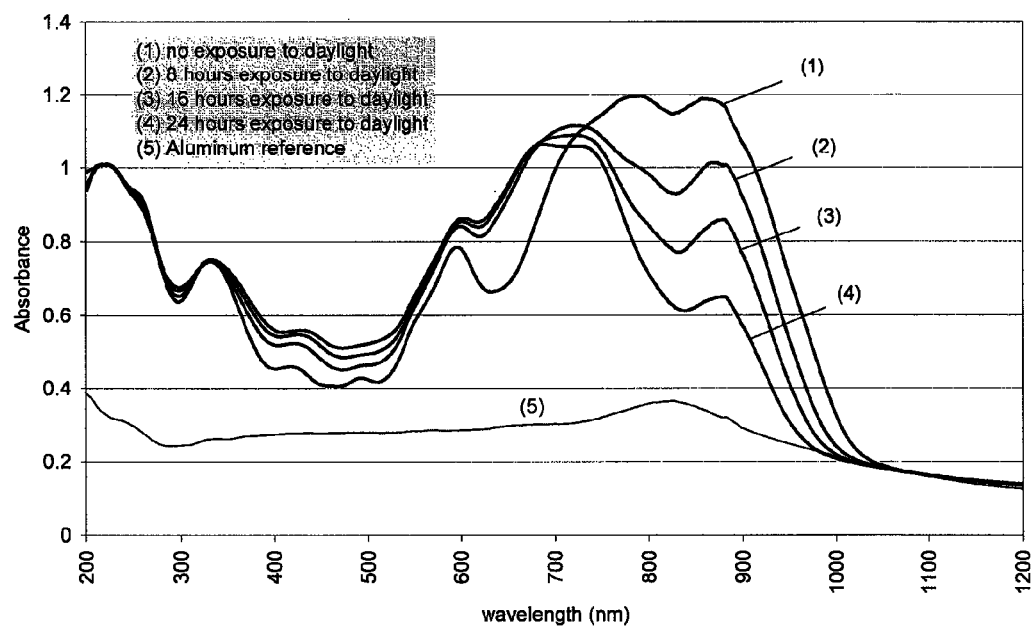

Figure 5: DRS spectra of PPP-12
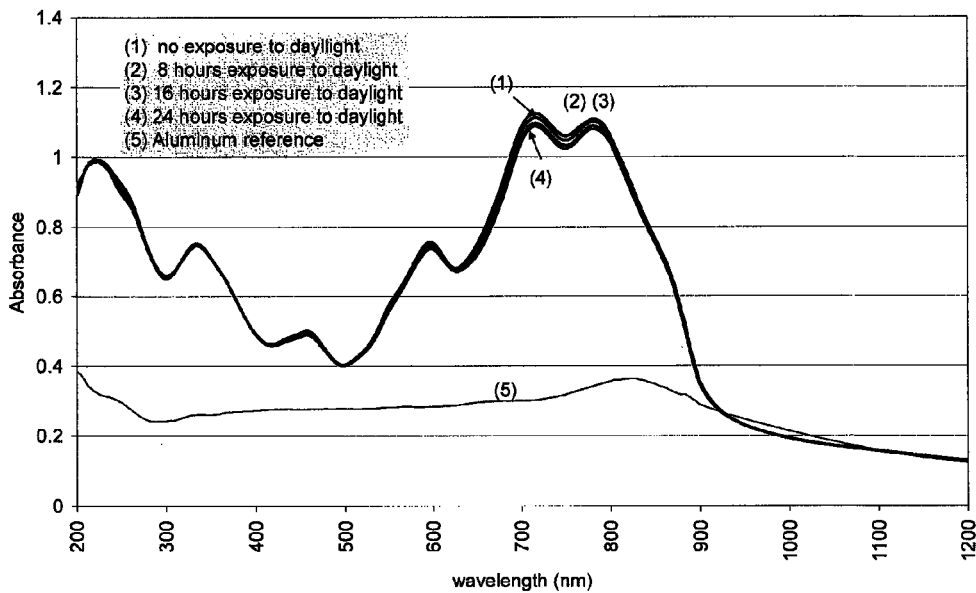
Figure 6: DRS spectra of PPP-11
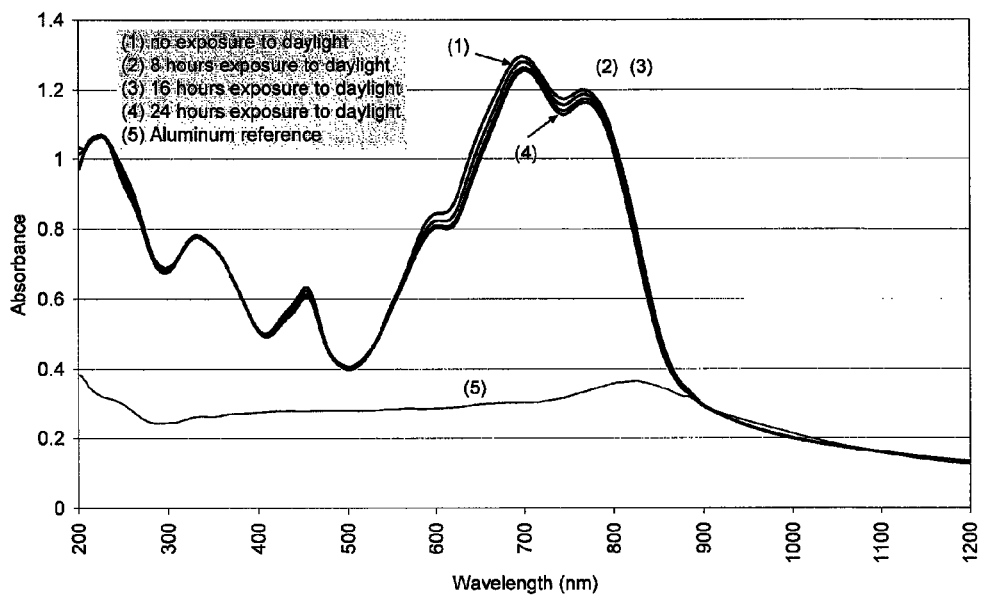

LITHOGRAPHIC PRINTING PLATE PRECURSOR

FIELD OF THE INVENTION

The present invention relates to a heat-sensitive, negative-working lithographic printing plate precursor.

BACKGROUND OF THE INVENTION

Lithographic printing presses use a so-called printing master such as a printing plate which is mounted on a cylinder of the printing press. The master carries a lithographic image on its surface and a print is obtained by applying ink to said image and then transferring the ink from the master onto a receiver material, which is typically paper. In conventional, so-called "wet" lithographic printing, ink as well as an aqueous fountain solution (also called dampening liquid) are supplied to the lithographic image which consists of oleophilic (or hydrophobic, i.e. ink-accepting, water-repelling) areas as well as hydrophilic (or oleophobic, i.e. water-accepting, ink-repelling) areas. In so-called driographic printing, the lithographic image consists of ink-accepting and ink-abhesive (ink-repelling) areas and during driographic printing, only ink is supplied to the master.

Printing masters are generally obtained by the image-wise exposure and processing of an imaging material called plate precursor. In addition to the well-known photosensitive, so-called pre-sensitized plates, which are suitable for UV contact exposure through a film mask, also heat-sensitive printing plate precursors have become very popular in the late 1990s. Such thermal materials offer the advantage of daylight stability and are especially used in the so-called computer-to-plate method wherein the plate precursor is directly exposed, i.e. without the use of a film mask. The material is exposed to heat or to infrared (IR) radiaton and the generated heat triggers a (physico-)chemical process, such as ablation, polymerization, insolubilization by cross linking of a polymer, heat-induced solubilization, or particle coagulation of a thermoplastic polymer latex.

Negative working thermal sensitive printing plate precursors, comprising thermoplastic polymer particles of which the imaging mechanism is based on coalescence or coagulation of the polymer particles have been disclosed in several applications. For example EP-As 770 494, 770 495, 770 496 and 770 497 disclose printing plate precursors comprising thermoplastic particles which, after exposure, are processed on press by supplying ink and/or fountain solution. EP-A 1 342 568 and WO2006/037716 disclose a method of making a lithographic printing plate wherein a precursor comprising thermoplastic particles is, after exposure, processed in a gum solution. EP-As 1 614 539 and 1 614 540 disclose a method of making a lithographic printing plate wherein a precursor comprising thermoplastic particles is, after exposure, processed in an alkaline solution.

EP-As 1 736 312 and 1 910 082 disclose lithographic printing plate precursors comprising thermoplastic particles and an IR-dye, said dye being capable of forming a print out image upon exposure to IR radiation. The visible print out image is formed by a chemical transformation of the IR-dye upon exposure to IR radiation. Precursors capable of forming a print out image upon IR exposure are very well suited to be used in an on-press processing set-up wherein the exposed precursor is mounted on the press and the non-image areas are subsequently removed by applying ink and/or fountain to the mounted precursor. The formation of a print out image enables a visible inspection of the non-processed precursor before mounting it on the press.

EP-As 1 859 935 and 1 859 936 disclose a lithographic printing plate precursor comprising thermoplastic particles having an average particle size between 10 and 40 nm and wherein the amount of IR-dye is adjusted as function of the particle size of the polymer particles.

EP-A 08 105 354.8 (filed on 2008 Sep. 16) discloses a lithographic printing plate precursor comprising a coating provided on a support having a hydrophilic surface, the coating containing thermoplastic polymer particles and an infrared radiation absorbing dye characterized in that the dye contains a substituent selected from bromo and iodo.

Various IR-dyes have been disclosed which can be used in printing plate precursors. Most of them have as central structure element a 5 or 6 membered ring as shown below.

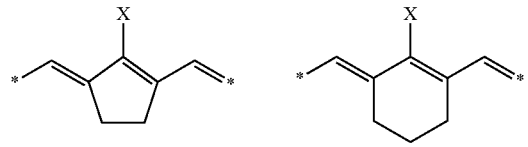

The synthesis of IR-dyes having such a central 5 or 6 ring is relatively easy, several of them are commercially available, and provide sufficient lithographic properties to precursors containing them.

However, it has been observed that a disadvantage of precursors comprising such IR-dyes may be a poor stability when stored under daylight conditions. It seems that such IR-dyes may be oxidised when the precursors are stored under daylight. This instability may result in a loss of sensitivity, a worsening of the clean-out behaviour, i.e. removal of the non-image areas during development, and a change of colour of the precursor. These phenomena become more pronounced under prolonged storage under daylight conditions. Exposure to daylight may occur, for example, for the uppermost precursor of a stack of precursors loaded in a platesetter. It has been observed that, when the platemaking process is resumed, for example after a couple of days, the lithographic properties of such an uppermost precursor of a stack of precursors may have changed compared with the other precursors of the stack.

SUMMARY OF THE INVENTION

It is an object of the invention to provide lithographic printing plate precursors comprising thermoplastic particles and an IR-dye, the precursor having an improved daylight stability.

The object of the present invention is realized with a lithographic printing plate precursor as disclosed herein. Preferred embodiments of the present invention are also disclosed.

BRIEF DESCRIPTION OF THE DRAWINGS

FIGS. 1 to 6 show the DRS spectra of respectively PPP-01, PPP-02, PPP-09, PPP-14, PPP12 and PPP-11 as a function of exposure time to daylight.

DETAILED DESCRIPTION OF THE INVENTION

Infrared Radiation Absorbing Dye (IR-Dye)

It has been observed that IR-dyes having as central structural element a 5 or 6 membered ring, as shown above, are sensitive towards oxidation upon exposure of the precursor containing them to daylight. It has been found that such an oxidation may result in a substantial change of the absorption spectrum of the IR-dye upon exposure to daylight. Often, these spectral changes result in a decreased absorption in the IR region of the spectrum and an increased absorption in the visible region of the spectrum. This may result in a decrease of the sensitivity of the precursor to IR radiation and a change of colour of the precursor.

It has now been found that lithographic printing plate precursors comprising thermoplastic particles and an IR-dye characterized in that the IR-dye contains a structural element according to Formula I are characterized by an improved daylight stability.

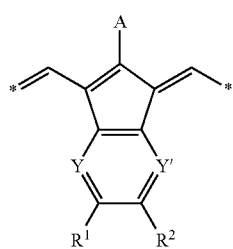

Formula I wherein
A represents hydrogen, halogen or a monovalent organic group;
Y and Y' independently represent —CH— or —N—;
$R^1$ and $R^2$ independently represent hydrogen, an optionally substituted alkyl or aryl group or represent the necessary atoms to form a ring;
* represents the linking positions to the rest of the molecule.

Preferably, the IR-dye has a structure according to Formula II,

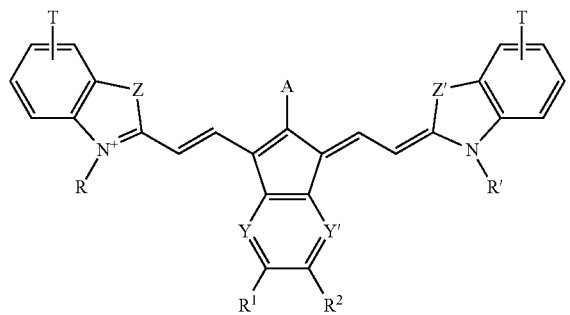

Formula II wherein
A, Y, Y', $R^1$ and $R^2$ have the same meaning as in Formula I;
T and T' independently represent hydrogen, alkyl, halogen, alkoxy, cyano, —$CO_2R^k$, —$CONR^lR^m$, —$SO_2R^n$, —$SO_2NR^oR^p$ or an optionally substituted annulated benzo ring wherein $R^l$, $R^m$ represent hydrogen, an optionally substituted alkyl or aryl group, $R^n$ represents an optionally substituted alkyl or aryl group and $R^o$ and $R^p$ represent hydrogen, an optionally substituted alkyl or aryl group;
$R^k$, R and R' independently represent an optionally substituted alkyl group;

Z and Z' independently represent —S—, —CH=CH— or —$CR^aR^b$—;
$R^a$ and $R^b$ represent an optionally substituted alkyl, aralkyl or aryl group.

When using anionically stabilized polymer particles, it is preferred that R and R' are anionic substituted alkyl groups. Preferred anionic substituted alkyl groups are selected from:

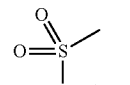

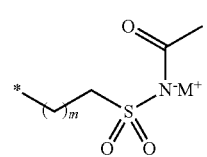

wherein
m is an integer ranging from 0 to 4;
X represents O, S or —$CH_2$—;
$M^+$ represents a monovalent cation
* represents the linking position to the rest of the molecule According to another preferred embodiment the IR-dye has a structure according to Formula III,

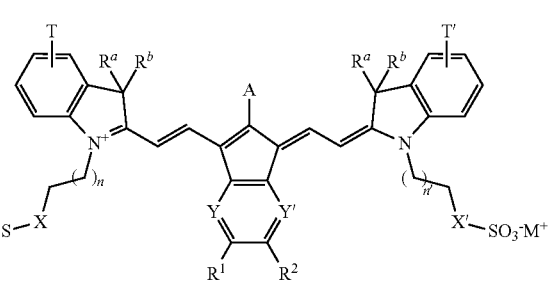

Formula III wherein
A, T, T', Y, Y', $R^1$, $R^2$, $R^a$ and $R^b$ have the same meaning as in Formula II;
X and X' independently represent O, S or —$CH_2$—;
n and n' are integers ranging from 0 to 3
$M^+$ represents a monovalent cation.

Preferred IR-dyes are also dyes having a structure according to Formula IV, VII and VIII,

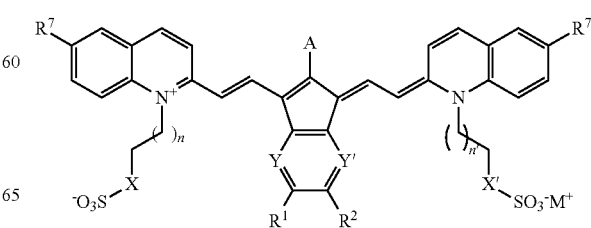

Formula IV

-continued

Formula VII

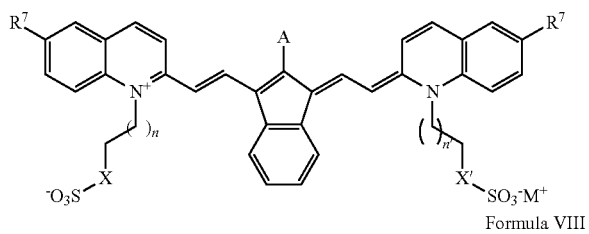

Formula VIII

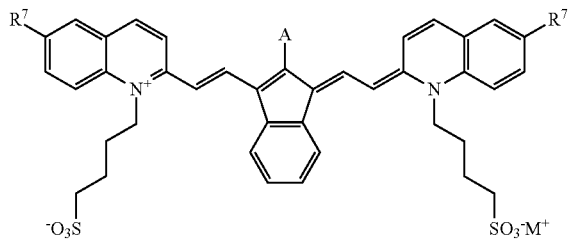

wherein
X, X', n, n', Y, Y', M⁺, $R^1$ and $R^2$ have the same meaning as in Formula III;
$R^7$ represents a hydrogen, halogen, alkyl or alkoxy group.

An advantage of IR-dyes according to Formula IV, VII and VIII may be the absorption characteristics. Introducing a structural element according to Formula I may result in an absorption spectrum of the IR-dye which is not optimal for an IR-exposure, for example at 830 nm. The IR-dyes according to Formula IV, VII or VIII, with chinolinium side groups, may be characterized by a more optimal absorption spectrum for such a 830 nm exposure.

With a viewpoint to optimize the absorption characteristic of the IR-dyes towards a 830 nm exposure, IR-dyes having a structure according to Formula V and VI are particularly preferred.

Formula V

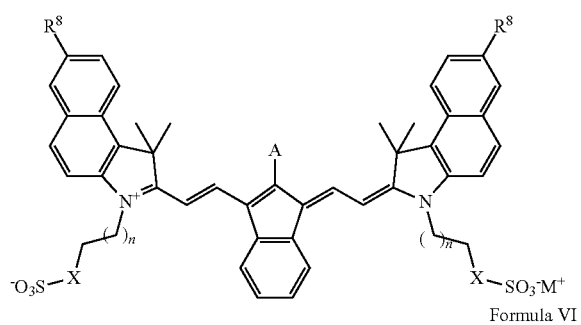

Formula VI

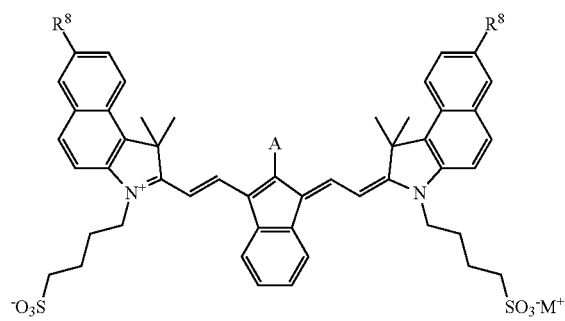

wherein
X, n, A and M⁺ have the same meaning as in Formula III;
$R^8$ represents hydrogen or Br.

The A group in Formula I to VIII represents a hydrogen, an optionally substituted alkyl, aralkyl or aryl group, halogen, —$OR^c$, —$SR^d$, —$SO_2R^e$, —$NR^fR^g$, —$NR^h(SO_2R^i)$ or —$NR^j(CO_2R^k)$ wherein $R^C$ represents an optionally substituted aryl group, $R^d$ represents an optionally substituted alkyl, aralkyl, aryl or heteroaryl group, $R^e$ represents an optionally substituted alkyl, aryl, or heteroaryl group, $R^f$ represents an optionally substituted alkyl, aralkyl or aryl group, $R^g$ represents an optionally substituted aryl group, $R^h$ represents an optionally substituted alkyl or aryl group, $R^i$ represents an optionally substituted alkyl or aryl group or —$NR^{i1}R^{i2}$ wherein $R^{i1}$ and $R^{i2}$ represent hydrogen, an optionally substituted alkyl or aryl group, $R^j$ represents an optionally substituted alkyl or aryl group and $R^k$ represents an optionally substituted alkyl group.

Preferably, the A-group in the Formula I to VIII may be selected from H, Cl, —$SR^d$, —$SO_2R^e$, —$NR^fR^g$, —$NR^h(SO_2R^i)$ and —$NR^j(CO_2R^k)$, wherein $R^d$, $R^e$, $R^f$, $R^g$, $R^h$, $R^i$, $R^j$ and $R^k$ are as described above.

In another preferred embodiment the A-group in the Formula I to VIII represents —$NR^h(SO_2R^i)$ or —$NR^j(CO_2R^k)$ wherein $R^h$, $R^i$, $R^j$ and $R^k$ are as described above. These compounds may preferably be prepared according the method disclosed in EP-A 07 123 764.8 (filed on 2007 Dec. 20).

The A-group in the Formula I to VIII may also be selected from:

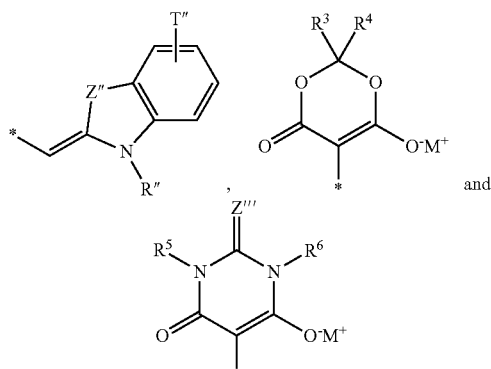

and wherein
Z" represents —S—, —CH=CH— or —$CR^aR^b$—;
$R^a$ and $R^b$ represent an optionally substituted alkyl, aralkyl or aryl group;
Z'" represents O or S;
R" represents an optionally substituted alkyl group;
T" represents hydrogen, alkyl, halogen, alkoxy, cyano, —$CO_2R^k$, —$CONR^lR^m$, —$SO_2R^n$, —$SO_2NR^oR^p$ or an optionally substituted annulated benzo ring wherein $R^l$, $R^m$ represent hydrogen, an optionally substituted alkyl or aryl group, $R^n$ represents an optionally substituted alkyl or aryl group and $R^o$ and $R^p$ represent hydrogen, an optionally substituted alkyl or aryl group;
$R^3$, $R^4$, $R^5$ and $R^6$ independently represent an optionally substituted alkyl, aralkyl or aryl group;
M⁺ represent a monovalent cation;
* represents the linking position to the rest of the molecule.
Examples of IR-dyes according to the present invention are given below.

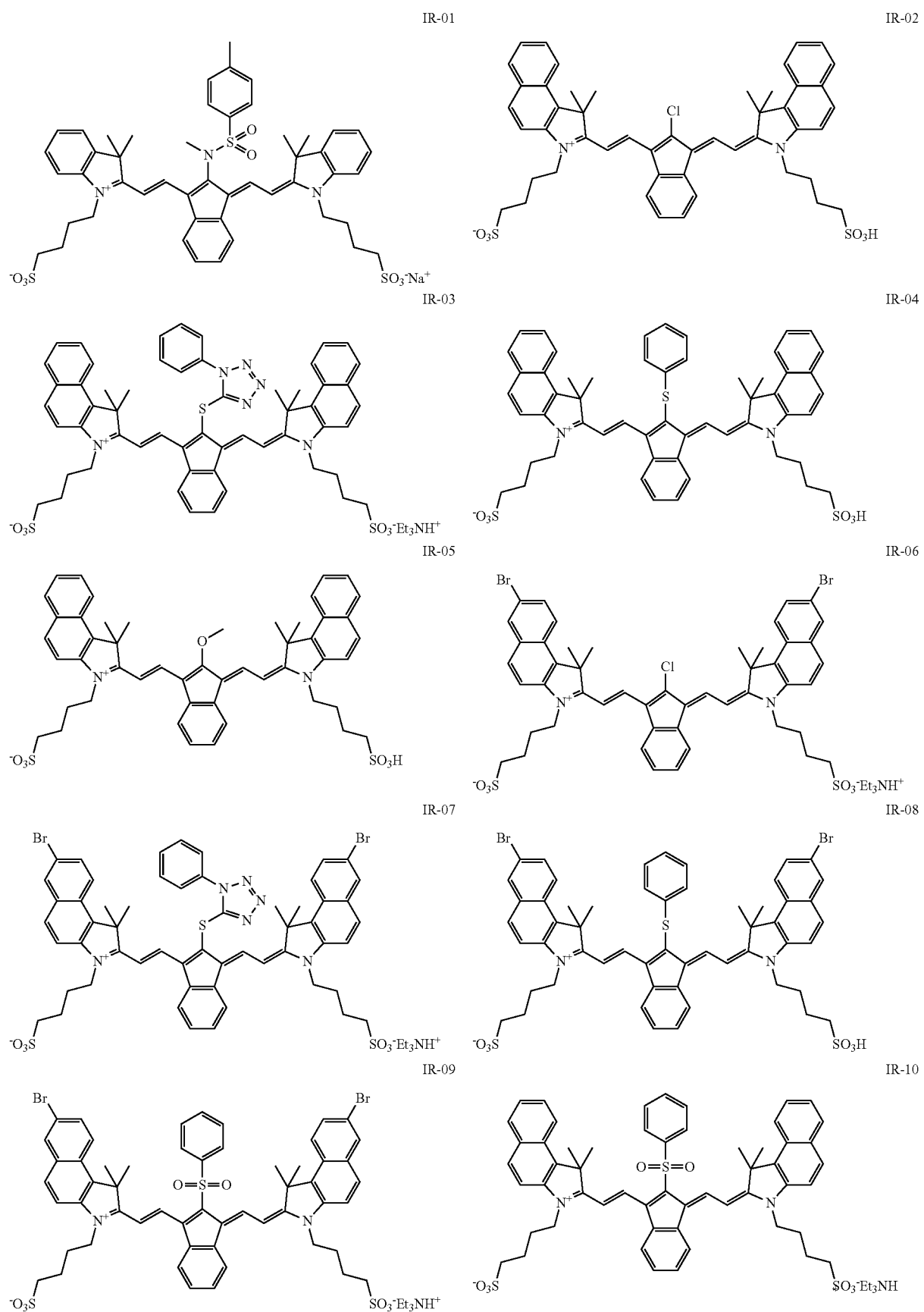

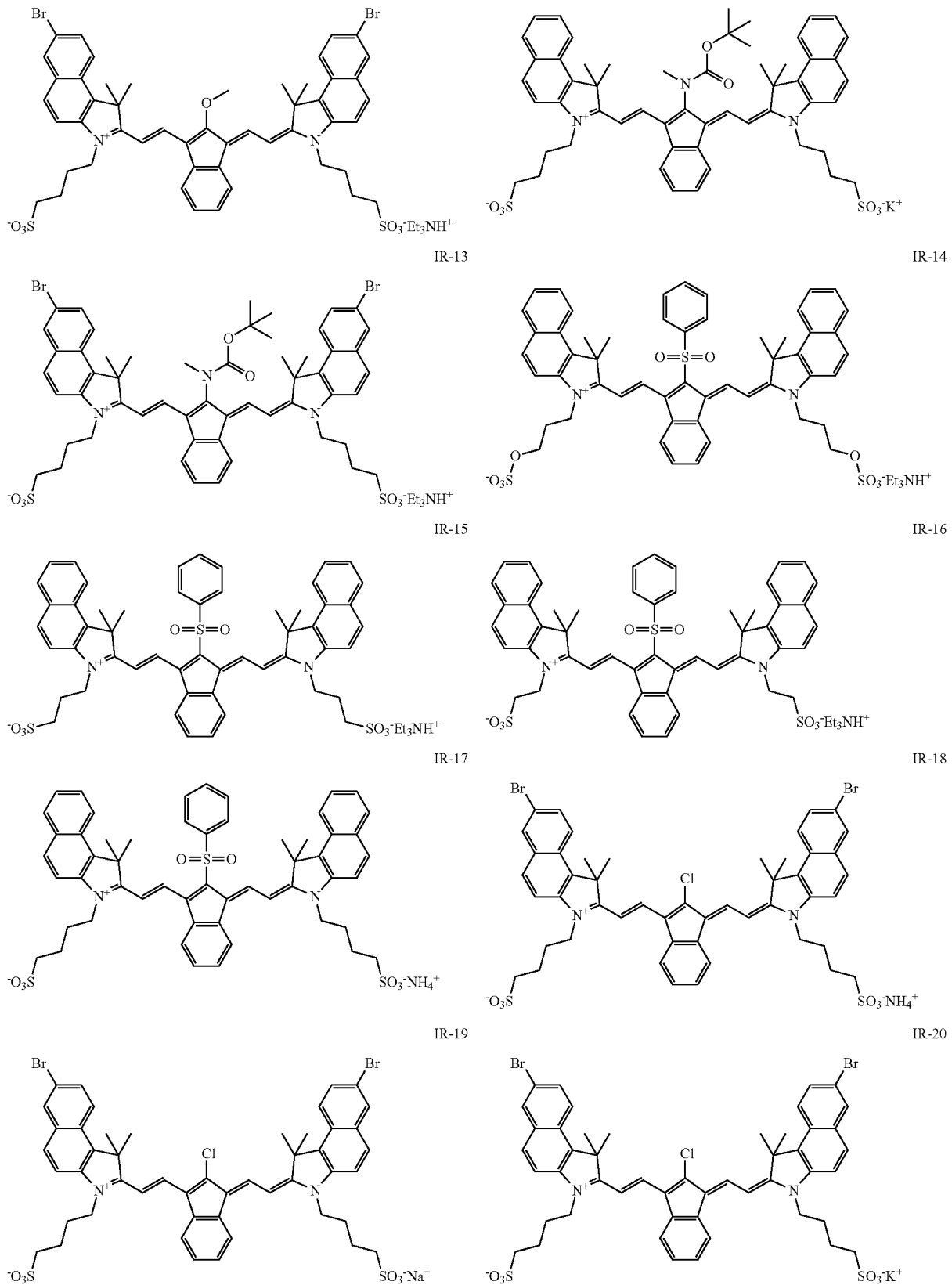

-continued
IR-21
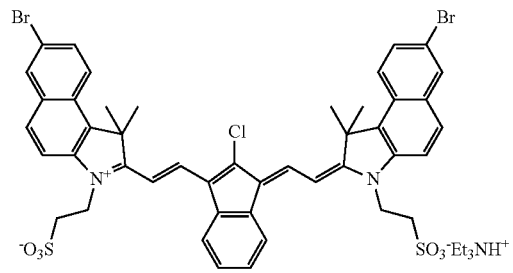
IR-22
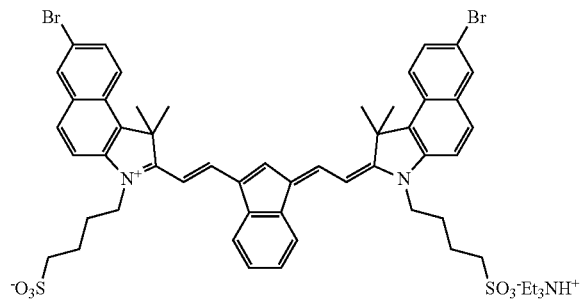
IR-23
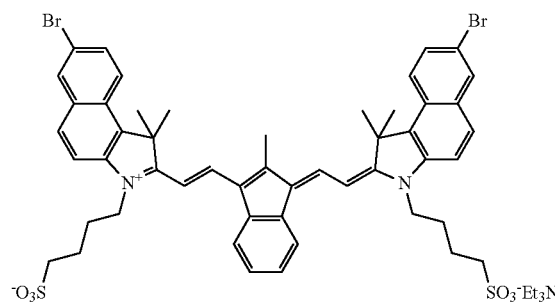
IR-24
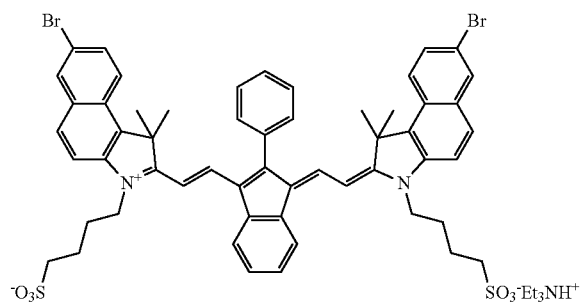
IR-25
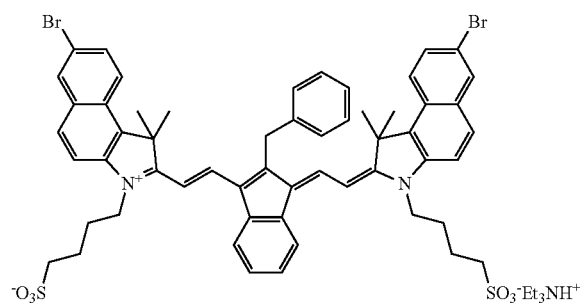
IR-26
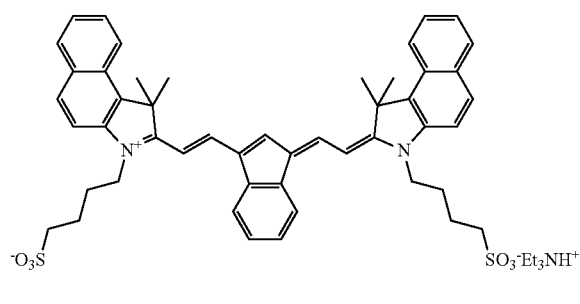
IR-27
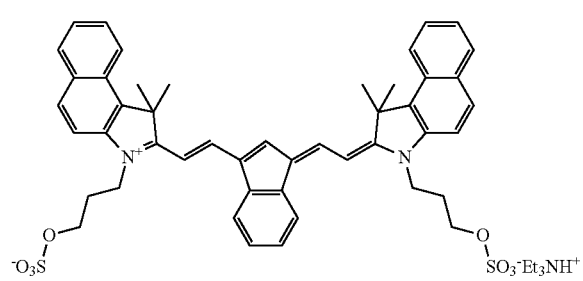
IR-28
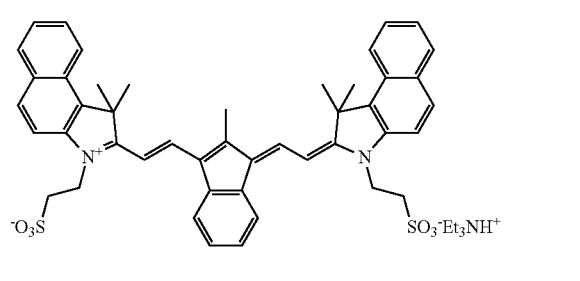
IR-29
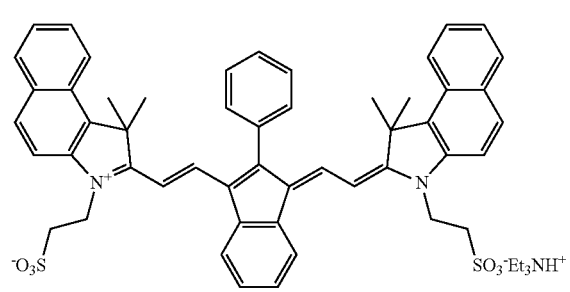
IR-30
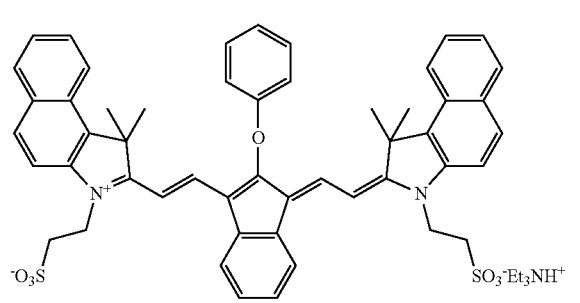

-continued
IR-31
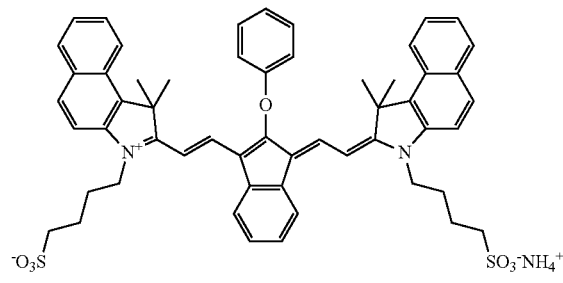
IR-32
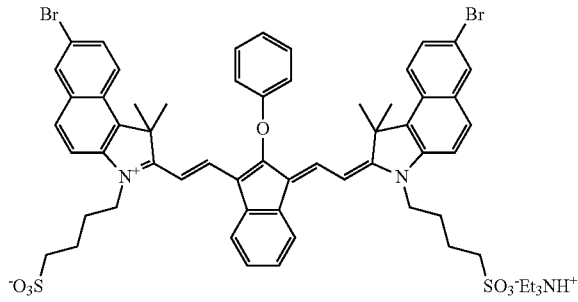
IR-33
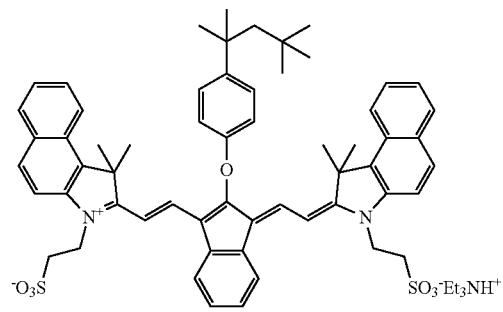
IR-34
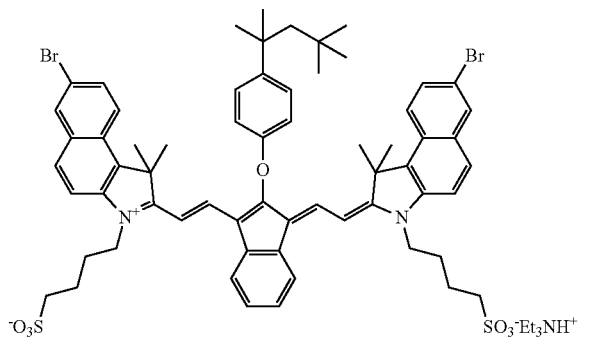
IR-35
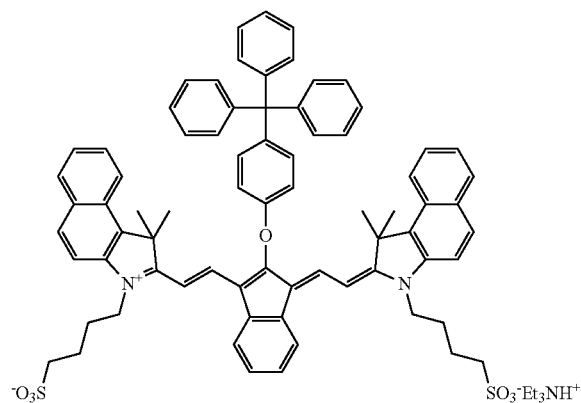
IR-36
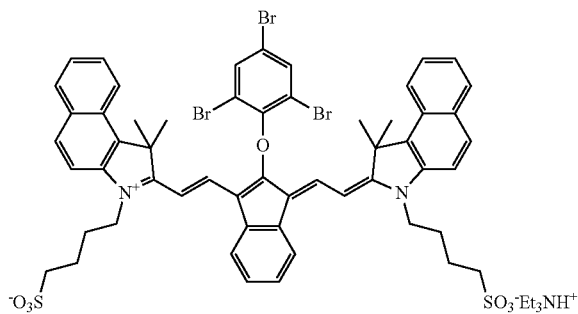
IR-37
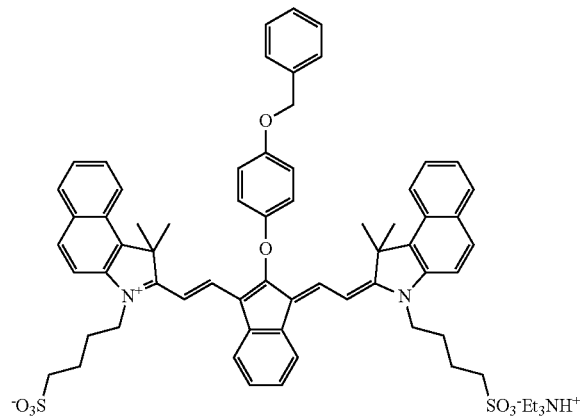
IR-38
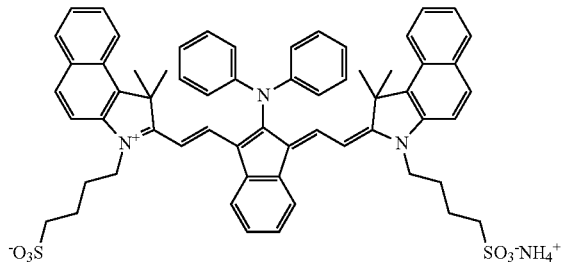

-continued
IR-39
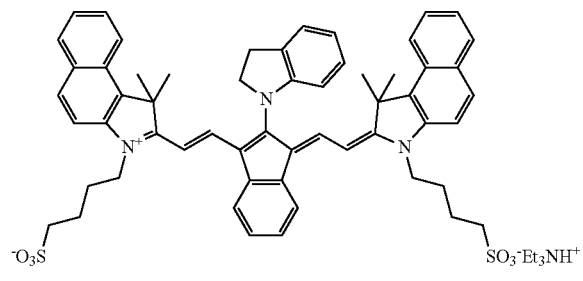
IR-40
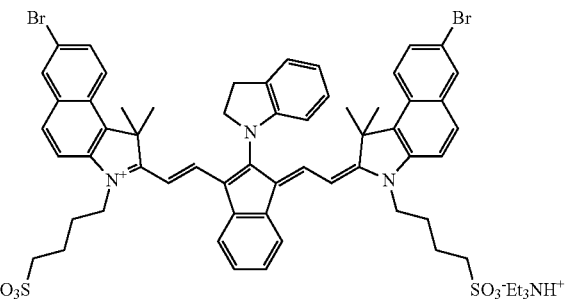
IR-41
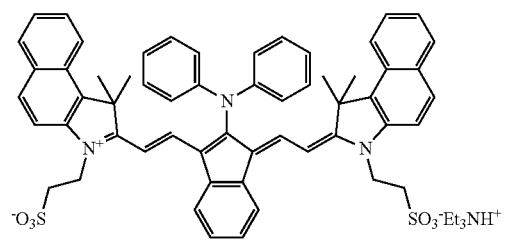
IR-42
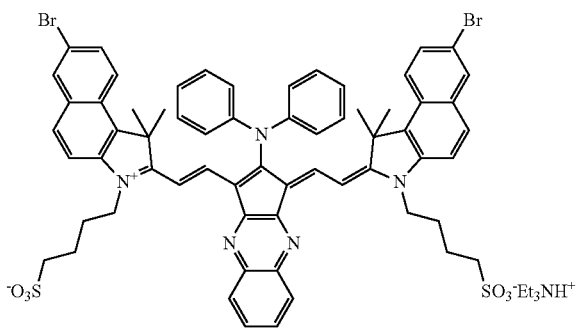
IR-43
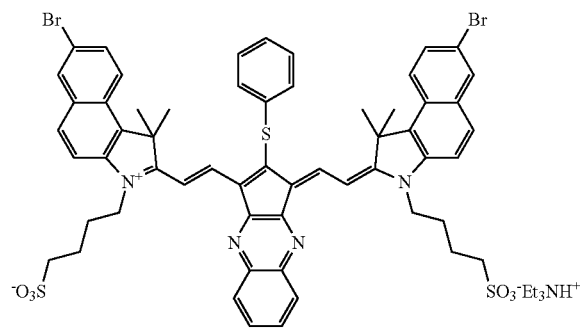
IR-44
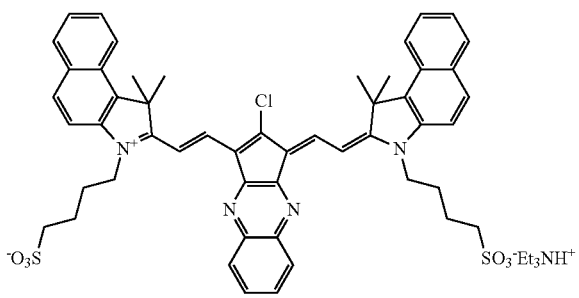
IR-45
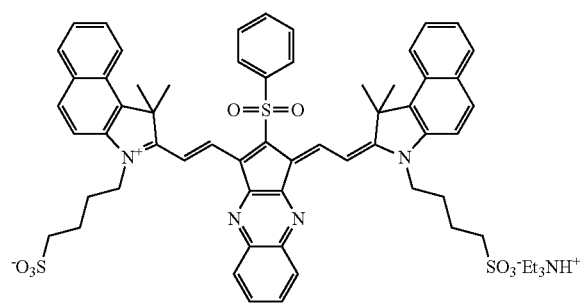
IR-46
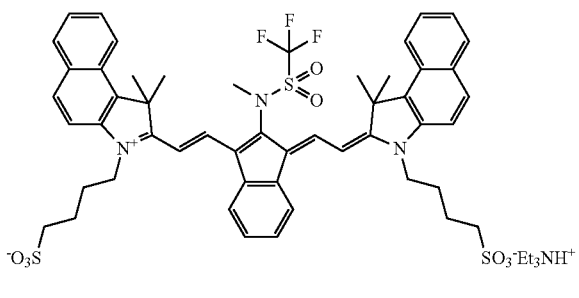

-continued
IR-47
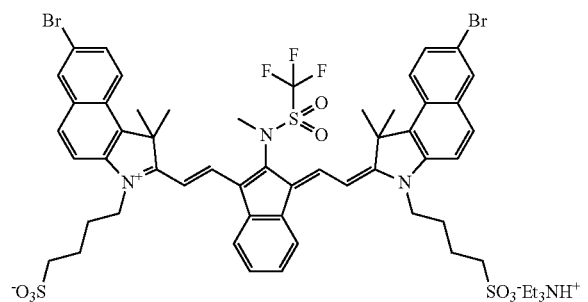
IR-48
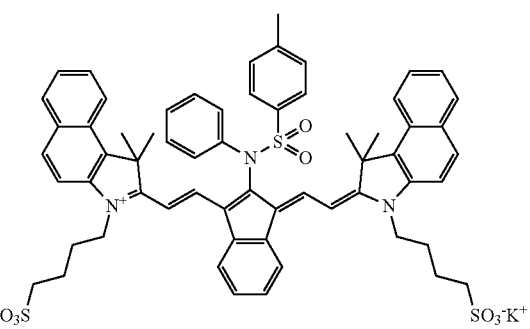
IR-49
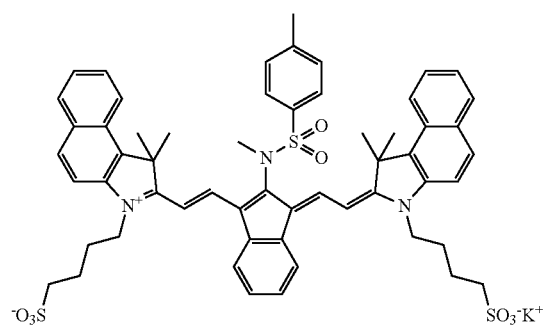
IR-50
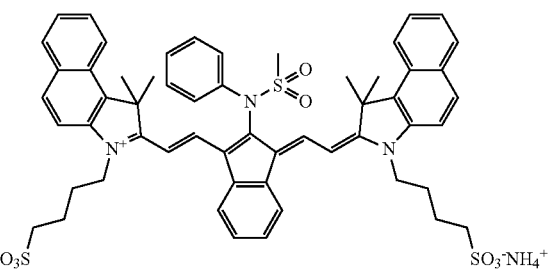
IR-51
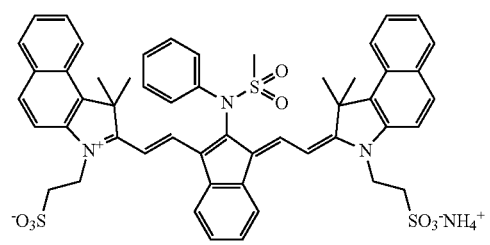
IR-52
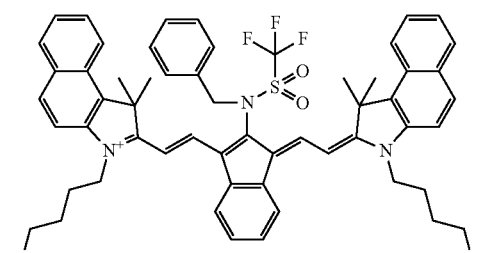
IR-53
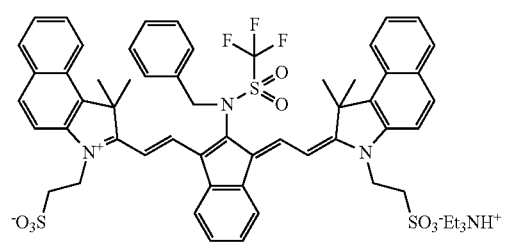
IR-54
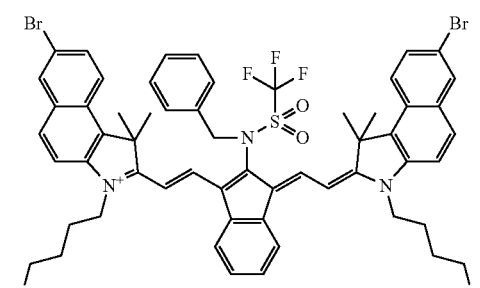
IR-55
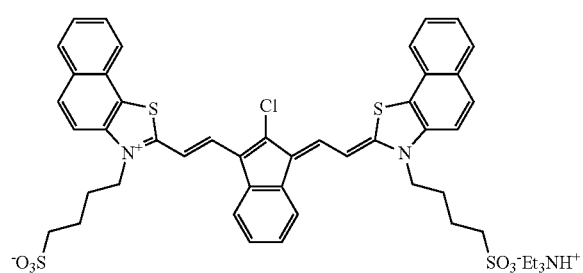
IR-56
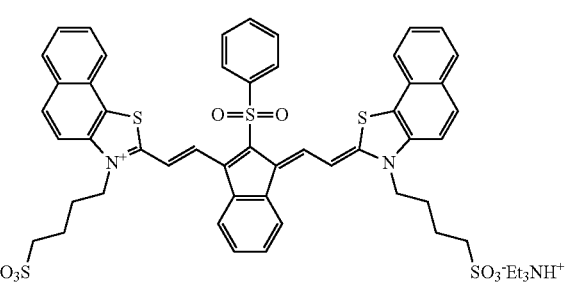

IR-57
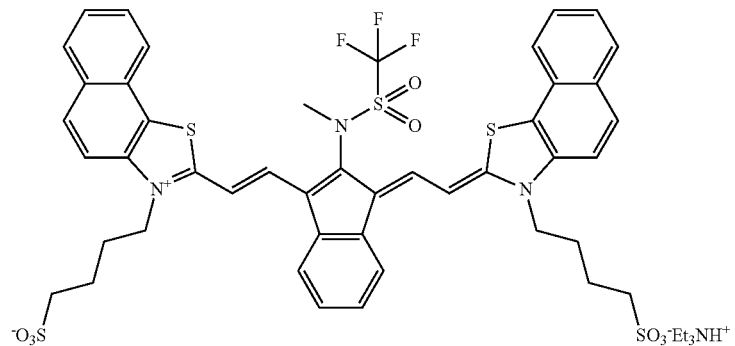
IR-58
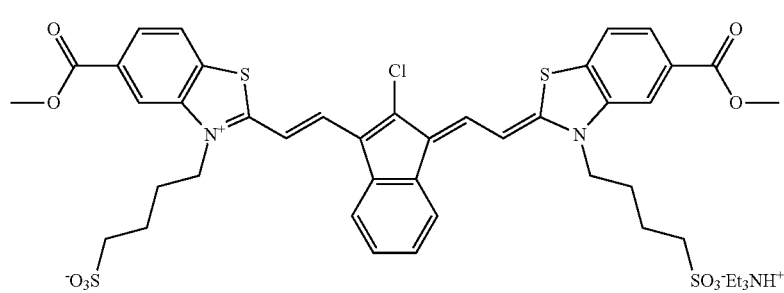
IR-59
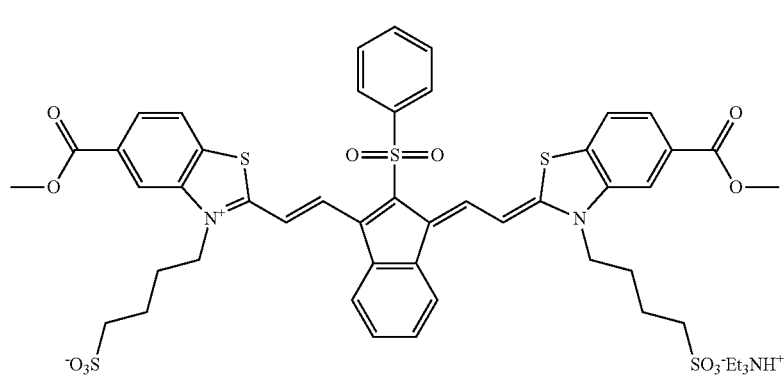
IR-60
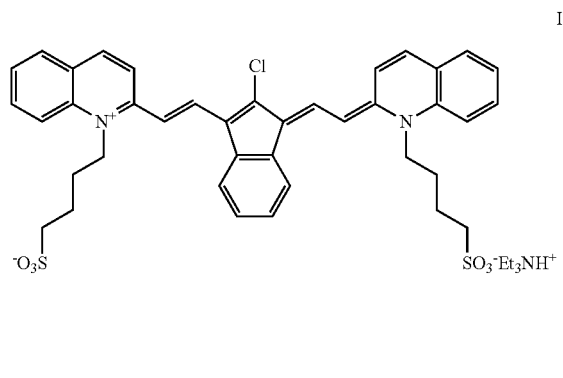
IR-61
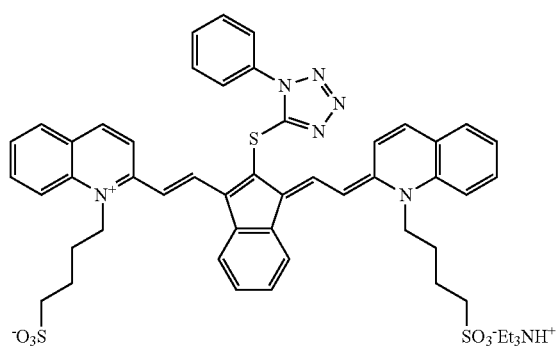

-continued
IR-62
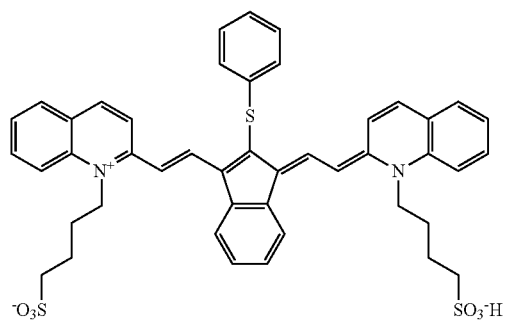
IR-63
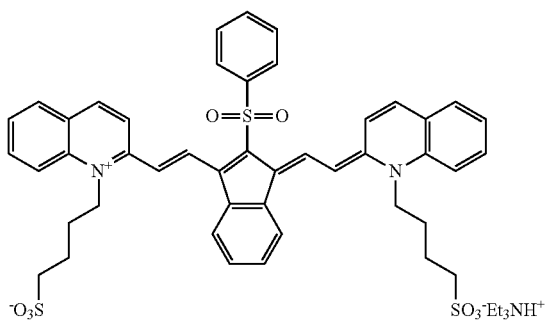
IR-64
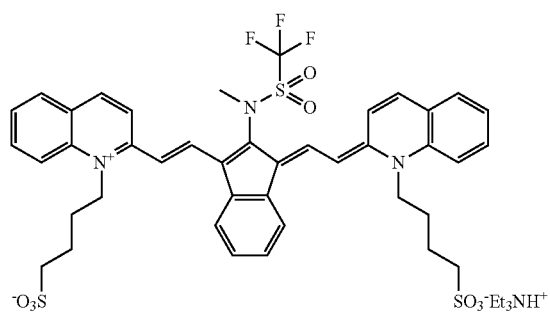
IR-65
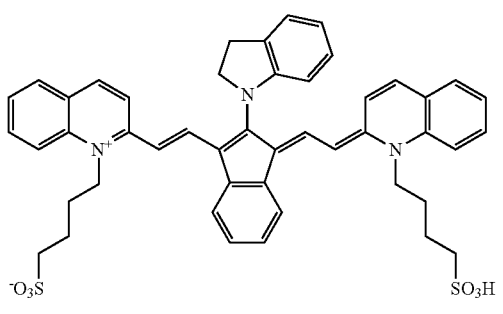
IR-66
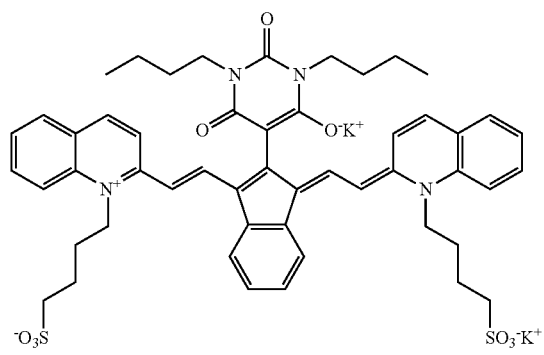
IR-67
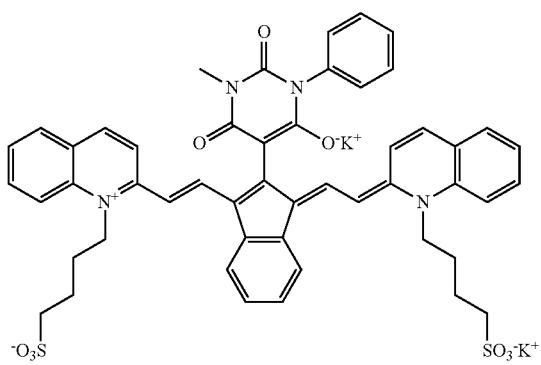
IR-68
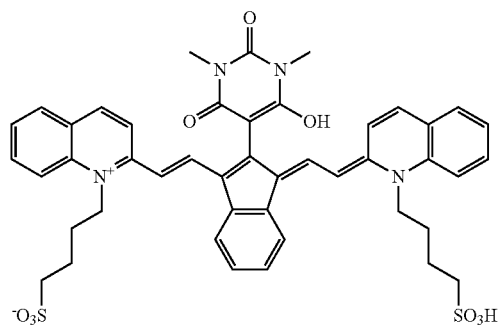
IR-69
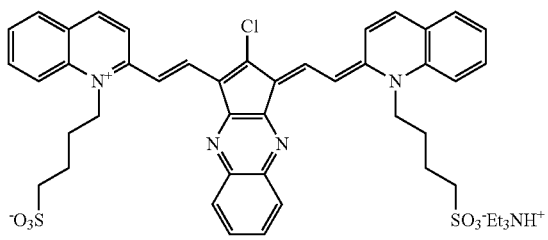

-continued
IR-70
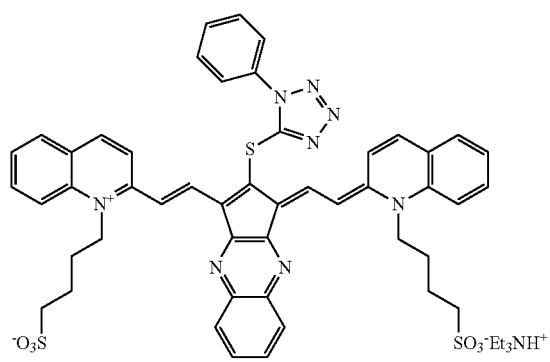
IR-71
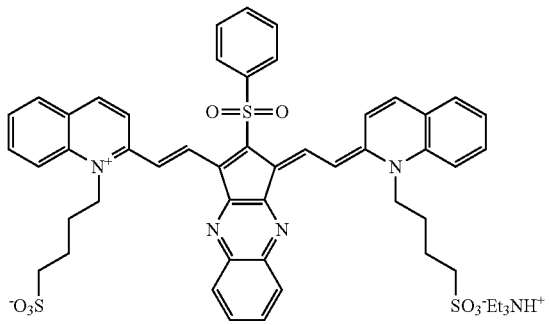
IR-72
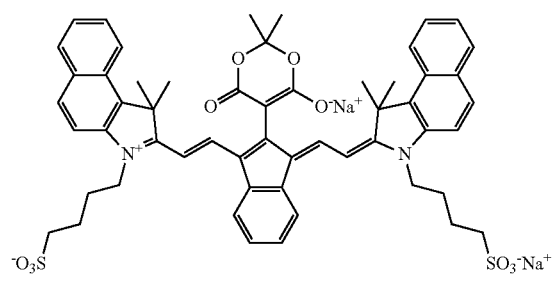
IR-73
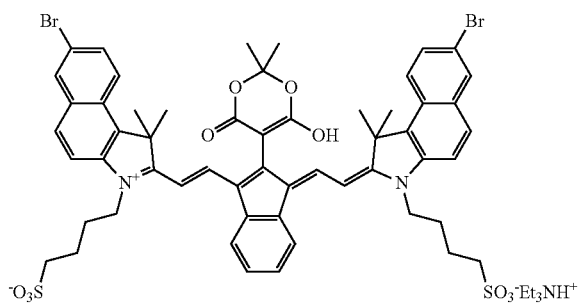
IR-74
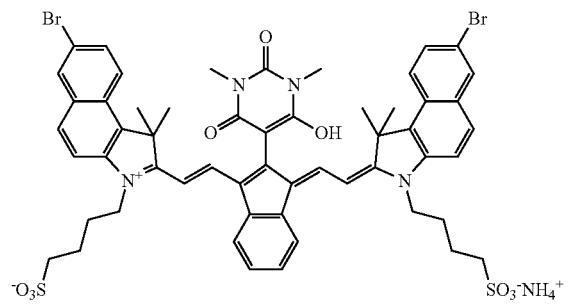
IR-75
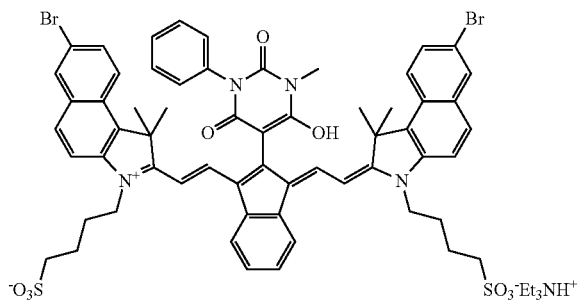
IR-76
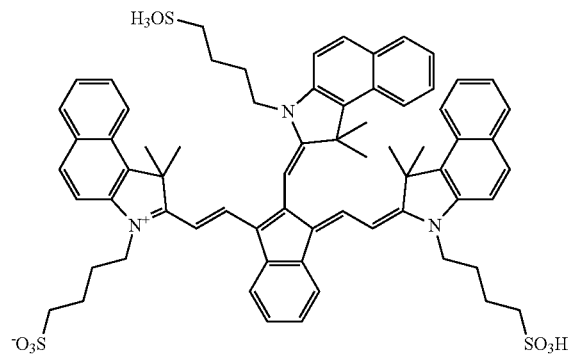
IR-77
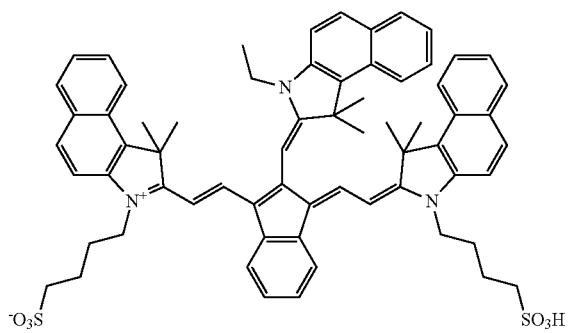

-continued
IR-78
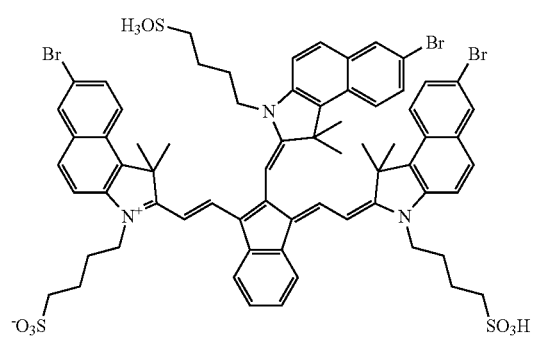
IR-79
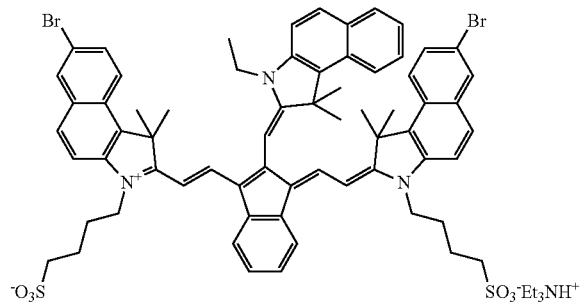
IR-80
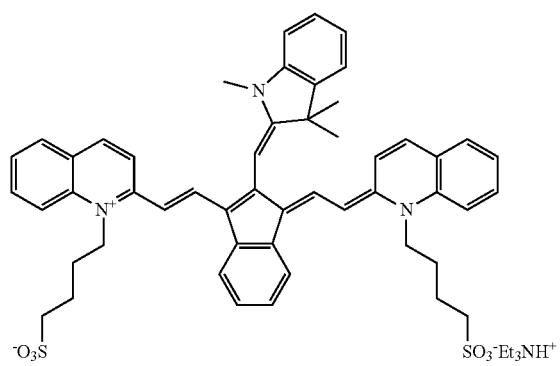
IR-81
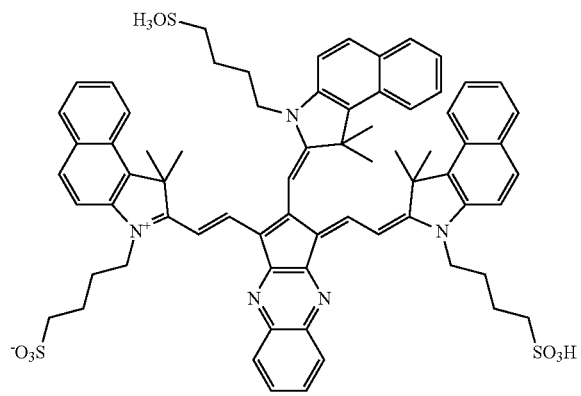
IR-82
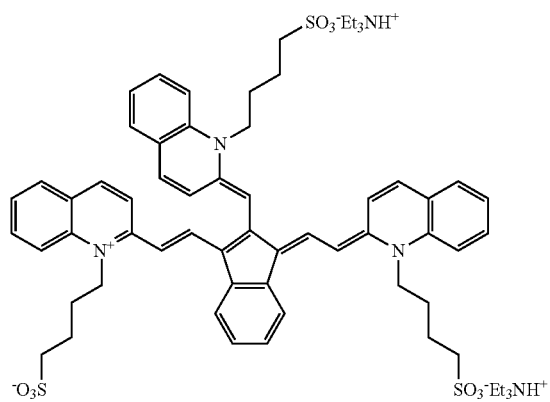
IR-83
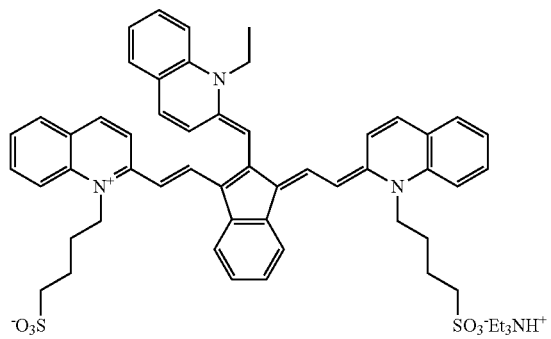
IR-84
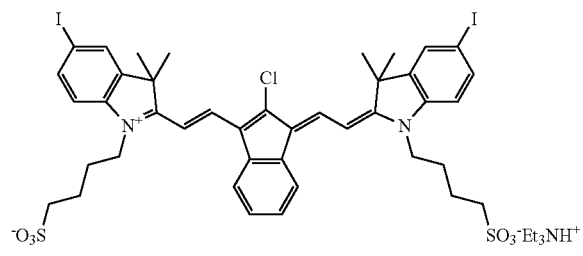
IR-85
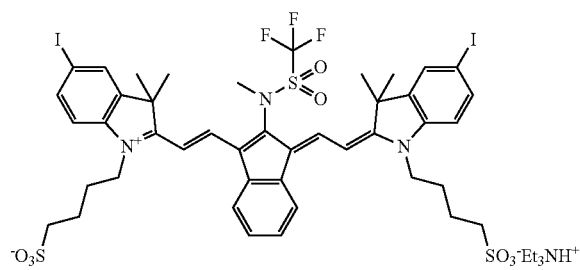

-continued
IR-86
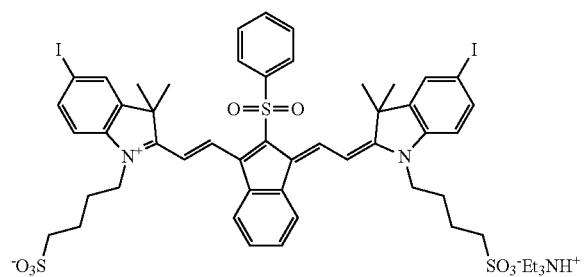
IR-87
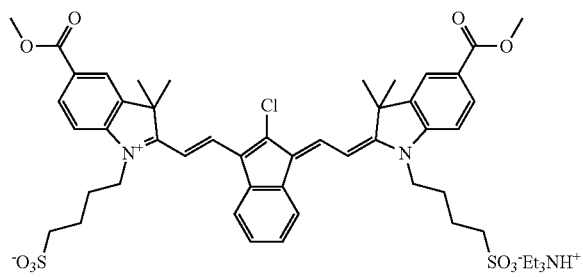
IR-88
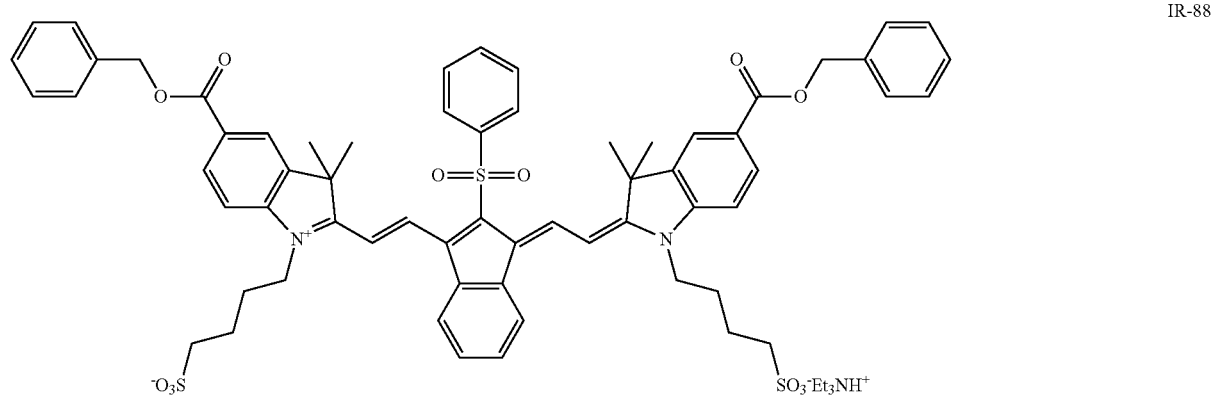
IR-89
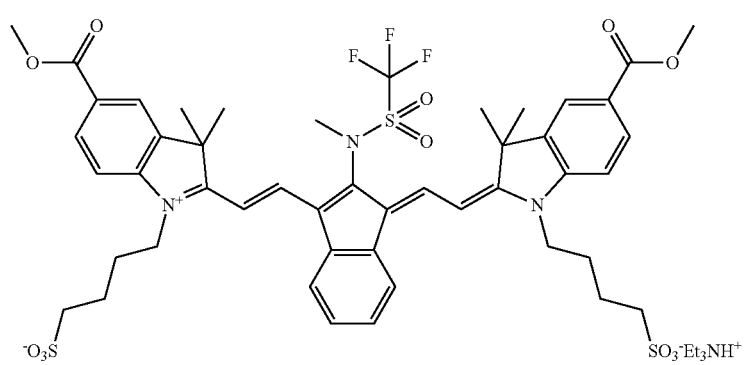
IR-90
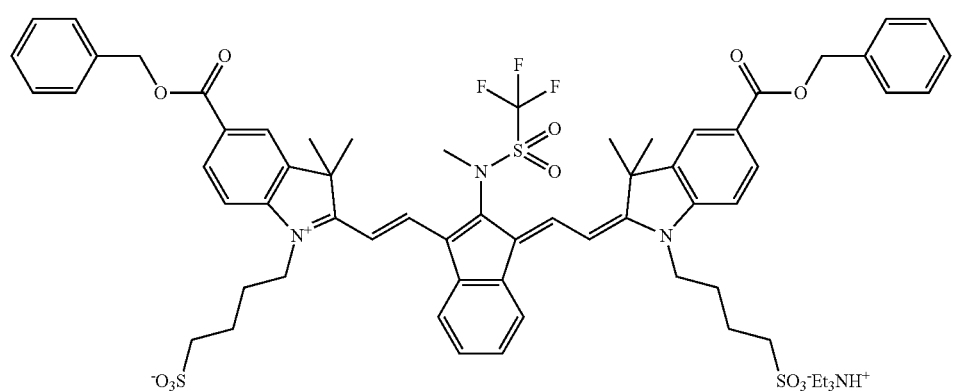

IR-91

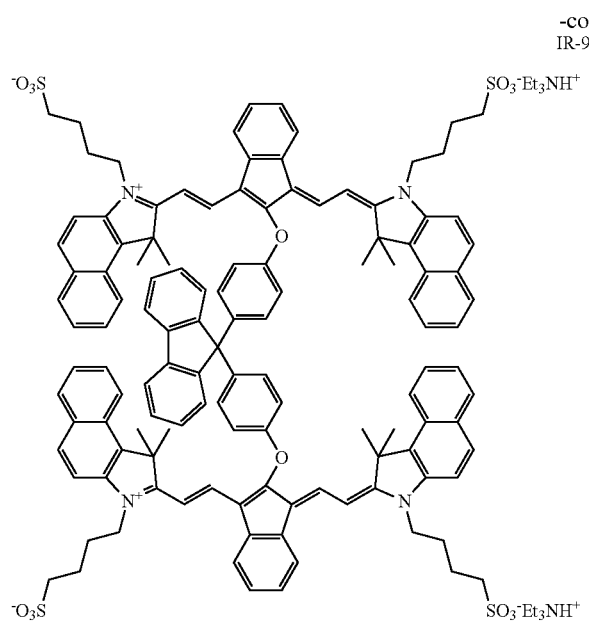

IR-92

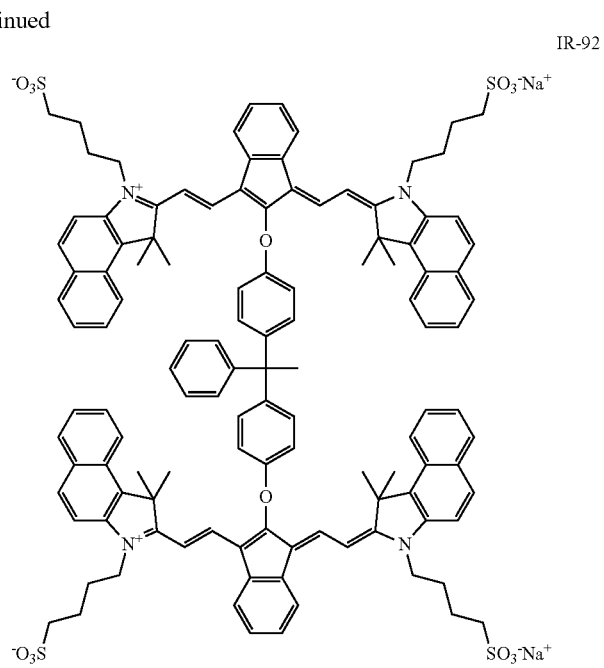

Thermoplastic Particles

The thermoplastic particles have an average particle diameter from 10 nm to 200 nm, preferably from 15 to 150 nm, more preferably from 20 to 75 nm, most preferably from 25 nm to 50 nm. The average particle diameter referred to in the claims and the description of this application is meant to be the average particle diameter measured by Photon Correlation Spectrometry, also known as Quasi-Elastic or Dynamic Light-Scattering, unless otherwise specified. The measurements were performed according the ISO 13321 procedure (first edition, 1996 Jul. 1) with a Brookhaven BI-90 analyzer, commercially available from Brookhaven Instrument Company, Holtsville, N.Y., USA.

The amount of thermoplastic polymer particles is preferably at least 50, more preferably at least 60, most preferably at least 70% by weight relative to the total weight of all the ingredients in the image-recording layer.

The thermoplastic polymer particles which are present in the coating may be selected from polyethylene, poly(vinyl) chloride, polymethyl(meth)acrylate, polyethyl(meth)acrylate, polyvinylidene chloride, poly(meth)acrylonitrile, polyvinylcarbazole, polystyrene or copolymers thereof.

According to a preferred embodiment, the thermoplastic polymer particles comprise polystyrene or derivatives thereof, mixtures comprising polystyrene and poly(meth)acrylonitrile or derivatives thereof, or copolymers comprising styrene and (meth)acrylonitrile or derivatives thereof. The latter copolymers may comprise at least 30% by weight of polystyrene, more preferably at least 50% by weight of polystyrene. In order to obtain sufficient resistivity towards organic chemicals such as hydrocarbons used in e.g. plate cleaners, the thermoplastic polymer particles preferably comprise at least 5% by weight, more preferably at least 30% by weight, of nitrogen containing units, such as (meth)acrylonitrile, as described in EP-A 1 219 416. According to the most preferred embodiment, the thermoplastic polymer particles consist essentially of styrene and acrylonitrile units in a weight ratio between 1:1 and 5:1 (styrene:acrylonitrile), e.g. in a 2:1 ratio.

The thermoplastic polymer particles may also comprise polymers or copolymers rendering the particles self-dispersible in an aqueous solution as for example disclosed in EP-As 1 834 764 and 1 157 829.

The thermoplastic polymer particles comprise preferably a polymer or co-polymer having a weight average molecular weight ranging from 5 000 to 1 000 000 g/mol.

The thermoplastic polymer particles can be prepared by addition polymerization or by condensation polymerization. They are preferably applied onto the lithographic base as dispersions in an aqueous coating liquid. These water based dispersions can be prepared by polymerization in a water-based system e.g. by free-radical emulsion polymerization as described in U.S. Pat. No. 3,476,937 or EP-A 1 217 010, or by means of dispersing techniques of the water-insoluble polymers into water. Another method for preparing an aqueous dispersion of the thermoplastic polymer particles comprises (1) dissolving the hydrophobic thermoplastic polymer in an organic water immiscible solvent, (2) dispersing the thus obtained solution in water or in an aqueous medium and (3) removing the organic solvent by evaporation. The thermoplastic particles are preferably prepared by an emulsion polymerization. Emulsion polymerization is typically carried out through controlled addition of several components—i.e. vinyl monomers, surfactants (dispersion aids), initiators and optionally other components such as buffers or protective colloids—to a continuous medium, usually water. The resulting polymer of the emulsion polymerization is a dispersion of discrete particles in water. The surfactants or dispersion aids which are present in the reaction medium have a multiple role in the emulsion polymerization: (1) they reduce the interfacial tension between the monomers and the aqueous phase, (2) they provide reaction sites through micelle formation in which the polymerization occurs and (3) they stabilize the growing polymer particles and ultimately the latex emulsion. The surfactants are adsorbed at the water/polymer interface and thereby prevent coagulation of the fine polymer particles. A wide variety of surfactants are used for the emulsion polymerisation. In general, a surfactant molecule contains both polar (hydrophilic) and non-polar (hydrophobic or lipophilic) groups. The most used surfactants are anionic or non-ionic surfactants. Widely used anionic surfactants are, alkylsulfates, alkyl ether sulfates, alkyl ether carboxylates, alkyl or aryl sulfonates, alkyl phosphates or alkyl ether phosphates. An example of an alkyl sulfate surfactant is sodium lauryl sulfate (e.g. Texapon K12 by the company Cognis). An example of an alkyl ether sulfate surfactant is laureth-2 sulfate sodium salt (e.g. Empicol ESB form the company Huntsman). An example of an alkyl ether carboxylate is laureth-6 carboxylate (e.g. Akypo RLM45 from the company Kao Chemicals). An example of an alkyl ether phosphate is Trideceth-3 phosphate ester (e.g. Chemfac PB-133 from the company Chemax Inc.).

The critical micelle concentration (C.M.C.) of the used surfactants is an important property to control the particle nucleation and consequently the particle size and stabilization of the polymer particles. The C.M.C. can be varied by variation of the degree of ethoxylation of the surfactant. Alkyl ether sulfates having a different degree of ethoxylation are for example Empicol ESA (Laureth-1 sulfate sodium salt), Empicol ESB (Laureth-2 sulfate sodium salt) and Empicol ESC (Laureth-3 sulfate sodium salt). Alkyl ether carboxylates having a different degree of ethoxylation are for example Akypo RLM-25 (Laureth-4 carboxylic acid), Akypo RLM-45 (Laureth-6 carboxylic acid) and Akypo RLM-70 (Laureth-8 carboxylic acid). Alkyl ether phosphates having a different degree of ethoxylation are for example Chemfac PB-133 (Trideceth-3 phosphate ester, acid form), Chemfac PB-136 (Trideceth-6-phosphate ester, acid form) and Chemfac PB-139 (Trideceth-9-phosphate ester, acid form).

The carboxylate and phosphate ester surfactants are usually supplied in the acid form. In order to prepare an aqueous solution of these surfactants, a base such as NaOH, $Na_2CO_3$, $NaHCO_3$, $NH_4OH$, or $NH_4HCO_3$ must be added.

In a preferred embodiment, the thermoplastic particles are prepared by emulsion polymerization in the presence of a surfactant selected from alkyl phosphates and alkyl ether phosphates.

Binder

The image-recording layer may further comprise a hydrophilic binder. Examples of suitable hydrophilic binders are homopolymers and copolymers of vinyl alcohol, (meth)acrylamide, methylol (meth)acrylamide, (meth)acrylic acid, hydroxyethyl(meth)acrylate, maleic anhydride/vinylmethylether copolymers, copolymers of (meth)acrylic acid or vinylalcohol with styrene sulphonic acid. Preferably, the hydrophilic binder comprises polyvinylalcohol or polyacrylic acid.

The amount of hydrophilic binder may be between 2 and 30% by weight, preferably between 2 and 20% by weight, more preferably between 3 and 10% by weight relative to the total weight of all ingredients of the image-recording layer.

The amount of the hydrophobic thermoplastic polymer particles relative to the amount of the binder is preferably between 8 and 25, more preferably between 10 and 22, most preferably between 12 and 20.

Contrast Dyes

Colorants, such as dyes or pigments, which provide a visible color to the coating and remain in the exposed areas of the coating after the developing step, may be added to the coating. The areas which are not removed during the developing step, form a visible image on the printing plate and inspection of the lithographic image on the developed printing plate becomes feasible. Typical examples of such contrast dyes are the amino-substituted tri- or diaryl-methane dyes. In a preferred embodiment, anionic tri- or diaryl-methane dyes are used. Dyes which, combined with specific additives, only slightly colour the coating but which become intensively coloured after exposure, as described in for example WO2006/005688 are also of interest. Other preferred contrast dyes are those described in EP-A 1 914 069.

Typical contrast dyes may be combined, or even replaced by IR-dyes, capable of forming a visible colour upon exposure to IR radiation, as those described in EP-As 1 736 312 and 1 910 082.

Other Ingredients

Optionally, the coating may further contain additional ingredients. These ingredients may be present in the image-recording layer or in an optional other layer. For example, additional binders, polymer particles such as matting agents and spacers, surfactants such as perfluoro-surfactants, silicon or titanium dioxide particles, development inhibitors, development accelerators, colorants, metal complexing agents are well-known components of lithographic coatings.

Preferably the image-recording layer comprises an organic compound, characterised in that said organic compound comprises at least one phosphonic acid group or at least one phosphoric acid group or a salt thereof, as described in WO2007/045515.

To avoid degradation of the IR-dye, for example upon exposure of the precursor to daylight, a light stabilizer or anti-oxidant may be present in the coating. Preferred stabilizers, such as ascorbic or isoascorbic acid derivatives, are disclosed in EP-A 1 974 911 (paragraph [041] to [45]).

Other Layers of the Coating

To protect the surface of the coating, in particular from mechanical damage, a protective layer may optionally be applied on the image-recording layer. The protective layer generally comprises at least one water-soluble polymeric binder, such as polyvinyl alcohol, polyvinylpyrrolidone, partially hydrolyzed polyvinyl acetates, gelatin, carbohydrates or hydroxyethylcellulose. The protective layer may contain small amounts, i.e. less then 5% by weight, of organic solvents.

The IR-dyes mentioned above may be present in the image-recording layer or in the protective layer, or in both.

The thickness of the protective layer is not particularly limited but preferably is up to 5.0 μm, more preferably from 0.05 to 3.0 μm, particularly preferably from 0.10 to 1.0 μm.

The coating may further contain other additional layer(s) such as for example an adhesion-improving layer located between the image-recording layer and the support.

The coating may be applied on the support by any coating technique known in the art. After applying the coating, the applied layer(s) are dried as commonly known in the art. While drying the coating, in particular the image-recording layer, it is preferred to keep the temperature, measured as the wet coating temperature, below 45° C., more preferably below 40° C., most preferably below 35° C. and to keep the temperature, measured as the dry coating temperature, below 90° C., more preferably below 60° C.

Support

The support of the lithographic printing plate precursor has a hydrophilic surface or is provided with a hydrophilic layer. The support may be a sheet-like material such as a plate or it may be a cylindrical element such as a sleeve which can be slid around a print cylinder of a printing press.

In one embodiment of the invention the support is a metal support such as aluminum or stainless steel. The support can also be a laminate comprising an aluminum foil and a plastic layer, e.g. polyester film. A particularly preferred lithographic support is an aluminum support. Any known and widely used aluminum material can be used. The aluminum support has a thickness of about 0.1-0.6 mm. However, this thickness can be changed appropriately depending on the size of the printing plate used and the plate-setters on which the printing plate precursors are exposed.

To optimize the lithographic properties, the aluminum support is subjected to several treatments well known in the art such as for example: degrease, surface roughening, etching, anodization, sealing, surface treatment. In between such treatments, a neutralization treatment is often carried out. A detailed description of these treatments can be found in e.g. EP-As 1 142 707, 1 564 020 and 1 614 538.

A preferred aluminum substrate, characterized by an arithmetical mean center-line roughness Ra of less then 0.45μ is described in EP 1 356 926. Optimizing the pore diameter and distribution thereof of the grained and anodized aluminum surface as described in EP 1 142 707 and U.S. Pat. No. 6,692,890 may enhance the press life of the printing plate and may improve the toning behaviour. Avoiding large and deep pores as described in U.S. Pat. No. 6,912,956 may also improve the toning behaviour of the printing plate. An optimal ratio between pore diameter of the surface of the aluminum support and the average particle size of the thermoplastic particles may enhance the press run length of the plate and may improve the toning behaviour of the prints. This ratio of the average pore diameter of the surface of the aluminum support to the average particle size of the thermoplastic particles present in the image-recording layer of the coating, preferably ranges from 0.1 to 0.8, more preferably from 0.2 to 0.5.

Treatments of a grained and anodized aluminum surface are often referred to as post-anodic treatments. Preferred post-anodic treatments are the application of polyvinylphosphonic acid or derivatives thereof, of polyacrylic acid, of potassium fluorozirconate or a phosphate, of an alkali metal silicate, or combinations thereof, applied together or sequential to the surface of a grained and anodized aluminum support. Preferred combinations of treatments are disclosed in the unpublished EP-As 1 972 461 and 1 974 912.

It has been observed that when using the IR-dyes according to the present invention, a grained and anodized aluminum support without any post-anodic treatment may also be used. It has been observed that when using such a support a higher sensitivity of the precursor and especially a higher press run length with the obtained plate may be realized. When using such a support without any post-anodic treatment, it is preferred to develop the exposed precursor in an alkaline aqueous solution to ensure a sufficient clean-out behaviour.

Alternative supports for the plate precursor can also be used, such as amorphous metallic alloys (metallic glasses). Such amorphous metallic alloys can be used as such or joined with other non-amorphous metals such as aluminum. Examples of amorphous metallic alloys are described in U.S. Pat. No. 5,288,344, U.S. Pat. No. 5,368,659, U.S. Pat. No. 5,618,359, U.S. Pat. No. 5,735,975, U.S. Pat. No. 5,250,124, U.S. Pat. No. 5,032,196, U.S. Pat. No. 6,325,868, and U.S. Pat. No. 6,818,078. The following references describe the science of amorphous metals in much more detail and are incorporated as references: Introduction to the Theory of Amorphous Metals, N. P. Kovalenko et al. (2001); Atomic Ordering in Liquid and Amorphous Metals, S. I. Popel, et al; Physics of Amorphous Metals, N. P. Kovalenko et al (2001).

According to another embodiment, the support can also be a flexible support, which is provided with a hydrophilic layer. The flexible support is e.g. paper, plastic film, thin aluminum or a laminate thereof. Preferred examples of plastic film are poly-ethylene terephthalate film, polyethylene naphthalate film, cellulose acetate film, polystyrene film, polycarbonate film, etc. The plastic film support may be opaque or transparent. Particular examples of suitable hydrophilic layers that may be supplied to a flexible support for use in accordance with the present invention are disclosed in EP-A 601 240, GB 1 419 512, FR 2 300 354, U.S. Pat. No. 3,971,660, U.S. Pat. No. 4,284,705, EP 1 614 538, EP 1 564 020 and US 2006/0019196.

Exposure

Preferably, the printing plate precursor is imagewise exposed with infrared radiation, preferably near infrared radiation. The infrared radiation is converted into heat by an IR-dye as discussed above. The heat-sensitive lithographic printing plate precursor of the present invention is preferably not sensitive to visible radiation. Most preferably, the coating is not sensitive to ambient daylight, i.e. visible (400-750 nm) and near UV radiation (300-400 nm) at an intensity and exposure time corresponding to normal working conditions so that the material can be handled without the need for a safe light environment.

The printing plate precursors of the present invention can be exposed to infrared radiation by means of e.g. LEDs or an infrared laser. Preferably lasers, emitting near infrared radiation having a wavelength in the range from about 700 to about 1500 nm, e.g. a semiconductor laser diode, a Nd:YAG or a Nd:YLF laser, are used. Most preferably, a laser emitting in the range between 780 and 830 nm is used. The required laser power depends on the sensitivity of the image-recording layer, the pixel dwell time of the laser beam, which is determined by the spot diameter (typical value of modern platesetters at $1/e^2$ of maximum intensity: 10-25 μm), the scan speed and the resolution of the exposure apparatus (i.e. the number of addressable pixels per unit of linear distance, often expressed in dots per inch or dpi; typical value: 1000-4000 dpi).

In a preferred embodiment of this invention a useful lithographic image is obtained upon image-wise exposure of the printing plate precursor with IR radiation having an energy density, measured at the surface of said precursor, of 200 mJ/cm$^2$ or less, more preferably of 180 mJ/cm$^2$ or less, most preferably of 160 mJ/cm$^2$ or less. With a useful lithographic image on the printing plate, 2% dots (at 200 lpi) are perfectly visible on at least 1 000 prints on paper.

Two types of laser-exposure apparatuses are commonly used: internal (ITD) and external drum (XTD) platesetters. ITD platesetters for thermal plates are typically characterized by a very high scan speed up to 1500 m/sec and may require a laser power of several Watts. The Agfa Galileo T (trademark of Agfa Graphics N.V.) is a typical example of a platesetter using the ITD-technology. XTD platesetters for thermal plates having a typical laser power from about 20 mW to about 500 mW per laser beam operate at a lower scan speed, e.g. from 0.1 to 20 m/sec. The Agfa Xcalibur, Accento, Avalon and Avalon N platesetter families (trademark of Agfa Graphics N.V.) make use of the XTD-technology.

Due to the heat generated during the exposure step, the thermoplastic polymer particles may fuse or coagulate thereby forming a hydrophobic phase which corresponds to the printing areas of the printing plate. Coagulation may result from heat-induced coalescence, softening or melting of the thermoplastic polymer particles. There is no specific upper limit to the coagulation temperature of the thermoplastic polymer particles, however the temperature should be sufficiently below the decomposition temperature of the polymer particles. Preferably the coagulation temperature is at least 10° C. below the temperature at which the decomposition of the polymer particles occurs. The coagulation temperature is preferably higher than 50° C., more preferably above 100° C.

As an alternative, the printing plate precursor may be imagewise heated by a heating element to form an image.

Development

In one embodiment of the invention the printing plate precursor, after exposure, is developed off-press by means of a suitable processing liquid. In the development step, the non-exposed areas of the image-recording layer are at least partially removed without essentially removing the exposed areas, i.e. without affecting the exposed areas to an extent that renders the ink-acceptance of the exposed areas unacceptable. The processing liquid can be applied to the plate e.g. by rubbing with an impregnated pad, by dipping, immersing, (spin-)coating, spraying, pouring-on, either by hand or in an automatic processing apparatus. The developed plate precursor can, if required, be post-treated with rinse water, a suitable correcting agent or a preservative as known in the art.

The developing step with the processing liquid is preferably combined with mechanical rubbing, preferably by one, two or more rotating brushes, to better remove the non-images parts of the precursor. Preferred rotating brushes are described in US2007/0184387 (paragraphs [0255] to [0257]).

Development is preferably carried out by spraying the developing solution onto the precursor, i.e. spray development, or by dipping the precursor into the developing solution. Preferably, the development is carried out in an automatic processor equipped with supplying means for the developer and rubbing members. Spray development involves spraying a developing solution on the plate precursor, for example with one or more spray bars. Dip development involves immersion of the plate into a developing solution. The development may be a batch development, i.e. development is carried out with a batch of developer until development is no longer sufficient. At that moment a new batch of developer is introduced in the processor. Development may also be carried out with regeneration of the developer, whereby a given amount of fresh developer is added to the development solution as function of the number of plates already developed. The composition and/or concentration of the fresh developer added during regeneration may be the same or different to that of the initial developer.

During the development step, any water-soluble protective layer present is also removed. A protective overcoat may also be removed by carrying out a pre-wash before development.

According to a preferred embodiment the processing liquid used in the off-press development is an aqueous solution having a pH from 2 to 10, preferably from 3 to 9, more preferably from 4 to 8. Particularly preferred, the aqueous solution is a gum solution. A gum solution is essentially an aqueous solution comprising a surface protective compound capable of protecting the lithographic image of a printing plate against contamination. Suitable examples of such compounds are film-forming hydrophilic polymers or surfactants. When using a gum solution as developing solution, in the development step in the method according to the present invention the non-image areas of the precursor are removed and, in addition, a protective layer is provided on the developed printing plate. A layer that remains on the plate after development with the gum solution preferably comprises more than 0.01 g/m$^2$ of a surface protective compound.

The gum solution may be supplied as a ready-to-use developer or as a concentrated solution, which is diluted by the end user with water to a ready-to-use developer according to the instructions of the supplier: typically 1 part of the gum is diluted with 1 to 10 parts of water.

A preferred composition of the gum solution is disclosed in WO2005/111727 (page 6, line 5 to page 11, line 35) and EP-A 1 621 339 (paragraphs [0014] to [0061]).

Preferred surfactants are for example block copolymers based on ethylene oxide and propylene oxide such as the commercially available Pluronic® surfactants such as Pluronic 9400. Other preferred surfactants are tristyrylphenol ethoxylates such as the Emulsogen® surfactants, for example Emulsogen TS160 or TS200. Highly preferred, a combination of both these surfactants is used.

Besides the surface protective compound the gum solution preferably comprises a salt formed by reaction of an acid, selected from phosphoric acid and phosphorous acid, with a di- or tri-alkanolamine as disclosed in WO2008/138942.

When the time between the preparation of the printing plate and mounting that printing plate on a press to start printing is sufficiently short so that no severe contamination may take place, development may be carried out with any aqueous solution having preferably a pH between 2 and 10, even plain water. Also commonly used press room chemicals, for example fountain solutions or aqueous plate cleaners and/or conditioners may be used, if necessary after proper dilution.

According to another preferred embodiment the processing liquid used in the off-press development is an alkaline aqueous solution having a pH of at least 9, preferably at least 10, more preferably at least 11 and most preferably at least 12. The developer comprises an alkaline agent. In a preferred embodiment said alkaline agent comprises an alkaline silicate or metasilicate. The alkaline silicate or metasilicate exhibits an alkalinity when dissolved in water, and examples thereof include an alkali metal silicate and alkali metal metasilicate such as sodium silicate, sodium metasilicate, potassium silicate and lithium silicate, and ammonium silicate. Said alkaline silicate may be used alone, or in combination with another alkaline agent. The development performance of the alkaline aqueous solution may be easily modulated by adjusting the molar ratio of alkaline silicates and alkali metal hydroxides, represented by silicon oxide ($SiO_2$) and alkali oxide ($M_2O$, wherein M represents an alkali metal or an ammonium group). The alkaline aqueous solution has preferably a molar ratio $SiO_2/M_2O$ from 0.5 to 3.0, more preferably from 1.0 to 2.0, most preferably of 1.0. The concentration of alkaline silicate in the developer ranges generally from 1 to 14 weight %, preferably from 3 to 14 weight %, and more preferably from 4 to 14% weight %.

In another embodiment, the aqueous alkaline solution may comprise a nonreducing sugar. The nonreducing sugar denotes sugars having no reductive property due to the absence of a free aldehyde group or a free ketone group. Said nonreducing sugar is classified into trehalose-type oligosaccharides wherein a reductive group and another reductive group make a linkage; glycosides wherein a reductive group in a sugar is linked to a non-sugar compound; and sugar alcohols which are produced by reducing a sugar with hydrogenation. Said trehalose-type oligosaccharides include sucrose and trehalose, and said glycosides include alkyl glycosides, phenol glycosides, mustard oil glycosides and the like. Said sugar alcohols include D,L-arabitol, ribitol, xylitol, D,L-sorbitol, D,L-mannitol, D,L-iditol, talitol, dulcitol, allodulcitol and the like. Further, maltitol obtained by hydrogenation of disaccharide, a reduced material obtained by hydrogenation of oligosaccharide (a reduced starch syrup) and the like are preferably used. Pentaerythritol can also be used in the developing solution.

Of the above mentioned nonreducing sugars, preferred are sugar alcohols and sucrose, and particularly preferred are D-sorbitol, sucrose and a reduced starch syrup, since they have buffering action in appropriate pH range.

In addition to alkali metal silicates and/or nonreducing sugars, the developer may optionally contain further components, such as buffer substances, complexing agents, antifoam agents, organic solvents in small amounts, corrosion inhibitors, dyes, surfactants and/or hydrotropic agents as known in the art.

A preferred developer solution is an aqueous alkaline solution comprising at least 0.05 g/l of lithium ions, as disclosed in the unpublished EP-A 08 102 122.2 (filed on 2008 Feb. 28). The lithium ions may be introduced in the developer by adding a lithium salt to the developer. The lithium ions may be added in the form of organic salts like for example lithium benzoate, lithium citrate or lithium acetate. Preferably, the lithium ions are introduced in the developer by inorganic salts. Suitable inorganic lithium salts include lithium chloride, lithium perchlorate, lithium bromide, lithium tetraborate, lithium phosphate, lithium silicates, lithium nitrate, lithium hydroxide, lithium carbonate and lithium sulfate. The lithium may be introduced in the developer by one lithium salt or by two or more different lithium salts. In a preferred embodiment, the aqueous alkaline solution further comprises a mono alkali metal or ammonium salt of an organic carboxylic acid, having 4 to 12 carbon atoms and substituted with 3 to 11 hydroxyl groups. Said organic carboxylic acid is more preferably a sugar acid, i.e. a sugar compound having a carboxylic acid group. The sugar acids have preferably at least 3 hydroxyl groups, more preferably at least 4 hydroxyl groups, most preferably at least 5 hydroxyl groups. The sugar acids have preferably at most 11 hydroxyl groups, more preferably at most 7 hydroxyl groups, most preferably at most 6 hydroxyl groups. Said sugar acids include gluconic acid, D-glucaric acid, pentaric acid, D-galacturonic acid, D-glucuronic acid, heptonic acid, D-gluco-heptonic acid, tartaric acid, erythronic acid, L-arabinoic acid, D-arabino-2-hexulosonic acid, glucopyranuronic acid and muramic acid. Preferred examples are gluconic acid, D-gluco-heptonic acid and L-arabinoic acid. Gluconic acid is highly preferred in the developing solution of the present invention. It has been observed that the presence of a mono alkali metal or ammonium salt of an organic carboxylic acid, having 4 to 12 carbon atoms and substituted with 3 to 11 hydroxyl groups, in combination with the presence of the lithium ions in the developing solution may result in even better clean-out properties during the restart of the printing press. A preferred amount of the mono alkali metal or ammonium salt of an organic carboxylic acid, having 4 to 12 carbon atoms and substituted with 3 to 11 hydroxyl groups, for example of gluconic acid, is at least 0.025 mol/l, more preferably at least 0.04 mol/l, most preferably at least 0.08 mol/l. The molar ratio of lithium ions to gluconic acid, is preferably between 0.3 and 10.0, more preferably between 0.6 and 7.0, most preferably between 0.9 and 4.0.

For replenishment (also called regeneration) purposes, alkali metal silicate solutions having alkali metal contents of from 0.6 to 2.0 mol/l can suitably be used. These solutions may have the same silica/alkali metal oxide ratio as the developer and optionally contain further additives. Replenishment may be tailored to the developing apparatuses used, daily plate throughputs, image areas, etc. and are in general from 1 to 50 ml per square meter of plate precursor. Addition of replenisher can be regulated, for example, by measuring the conductivity of the developer as described in EP-A 0 556 690.

Off-press development is preferably carried out at temperatures of from 20 to 40° C. in automated processing units as customary in the art.

To increase the resistance of the finished printing plate and hence to extend the run length, the layer can be briefly heated to elevated temperatures ("baking"). The plate can be dried before baking or is dried during the baking process itself. During the baking step, the plate can be heated at a temperature which is higher than the glass transition temperature of the thermoplastic particles, e.g. between 100° C. and 230° C. for a period of 40 minutes to 5 minutes. A preferred baking temperature is above 60° C. For example, the exposed and developed plates can be baked at a temperature of 230° C. for 5 minutes, at a temperature of 150° C. for 10 minutes or at a temperature of 120° C. for 30 minutes. Baking can be done in conventional hot air ovens or by irradiation with lamps emitting in the infrared or ultraviolet spectrum. As a result of this baking step, the resistance of the printing plate to plate cleaners, correction agents and UV-curable printing inks increases. A baking process as disclosed in EP 1 767 349 may also be applied in the present invention.

The printing plate thus obtained can be used for conventional, so-called wet offset printing, in which ink and an aqueous dampening liquid is supplied to the plate. Another suitable printing method uses so-called single-fluid ink without a dampening liquid. Suitable single-fluid inks have been described in U.S. Pat. No. 4,045,232; U.S. Pat. No. 4,981,517 and U.S. Pat. No. 6,140,392. In a most preferred embodiment, the single-fluid ink comprises an ink phase, also called the hydrophobic or oleophilic phase, and a polyol phase as described in WO 00/32705.

In another embodiment of the invention the printing plate precursor, after exposure, is developed on-press, i.e. the exposed precursor is mounted on a printing press whereupon the non-image areas are removed by supplying ink and/or fountain to the mounted precursor. Preferably the development on-press is carried out as follows: while the print cylinder with the precursor mounted thereon rotates, the dampening form roller supplying the dampening liquid is dropped on the precursor, e.g. during 10 revolutions of the print cylinder, and subsequent thereto also the inking form rollers are dropped on the precursor. Generally, after about 100, more preferably after about 50 revolutions of the print cylinder, the first clear and useful prints are obtained, indicating the completion of the development. According to an alternative embodiment, the inking form rollers and the dampening form roller may be dropped simultaneously or the inking form rollers may be dropped first.

With regard to the dampening liquids useful in the present invention, there is no particular limitation and commercially available dampening liquids, also known as fountain solutions, can be used in the recommended dilution. The dampening liquid may comprise isopropyl alcohol (IPA) or any known IPA-replacing compound.

Preferably, after the on-press development is completed, the ink is removed from the plate by printing with the inking form rollers disengaged, so called "sheeting off" of the ink. Alternatively, one may also stop the press and clean the plate manually with a plate cleaner. One may also make use of any possible "washing device" on the press that allows cleaning the plate and removing the ink from its image areas during operation, while the ink and dampening form rollers are disengaged.

In another preferred embodiment, development off-press with e.g. a developing solution, wherein the non-exposed areas of the image recording layer are partially removed, may be combined with a development on press, wherein a complete removal of the non-exposed is realised.

EXAMPLES

Materials

All materials used in the examples were readily available from standard sources such as Aldrich Chemical Co. (Belgium) and Acros (Belgium) unless otherwise specified.

In the following list, ingredients used in the examples are listed. Where appropriate, it is mentioned how the ingredient (as a solution, as a dispersion etc.) is used in the examples.

Chemfac PB-133, an alkyl ether phosphate surfactant from Chemax Inc.
Texapon K12, sodium dodecyl sulphate from Alkemi BV.
HEDP, an aqueous solution containing 6 wt. % 1-hydroxyethylidene-1,1-diphosphonic acid from Solutia.
Zonyl FS0100, an aqueous solution containing 5 wt. % of the fluorinated surfactant Zonyl FS0100 from Dupont.
Pigment, an aqueous blue pigment dispersion from Cabot Corporation containing 5 wt. % of the modified Cu phthalocyanine pigment IJX883.
Binder-01, an aqueous solution containing 5 wt. % Glascol E15D from Ciba Specialty Chemicals and 1000 ppm biocide.
Binder-02, an aqueous solution containing 1.5 wt. % Aqualic AS58 from Nippon Shokubai.
Dye, an aqueous solution (ethanol/water 50/50) containing 1.0 wt. % of the following dye:

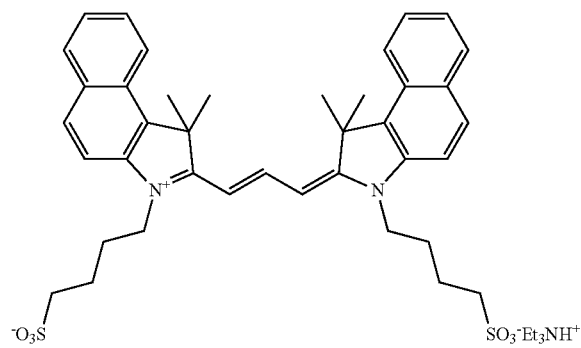

Proxel Ultra5, an aqueous 5 wt. % solution of 1,2 benzisothiazole-3(2H)-one from Arch Biocides UK.
TD1000, a developer from Agfa Graphics NV.
RC795, a gum solution available from Agfa Graphics NV.
COMP IR-01, a 1 wt. % ethanol/water (1/1) solution of the following dye:

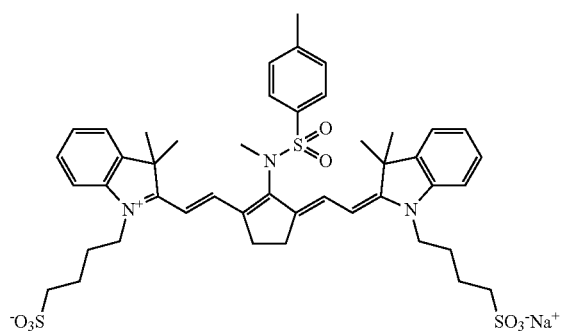

COMP IR-02, a 1 wt. % ethanol/water (1/1) solution of the following dye:

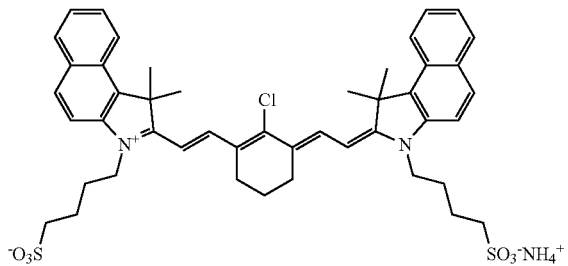

COMP IR-03, a 1 wt. % ethanol/water (1/1) solution of the following dye:

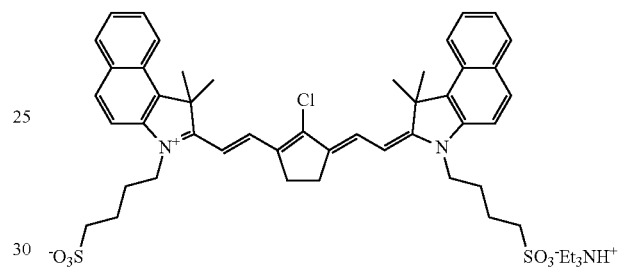

COMP IR-04, a 1 wt. % ethanol/water (1/1) solution of the following dye:

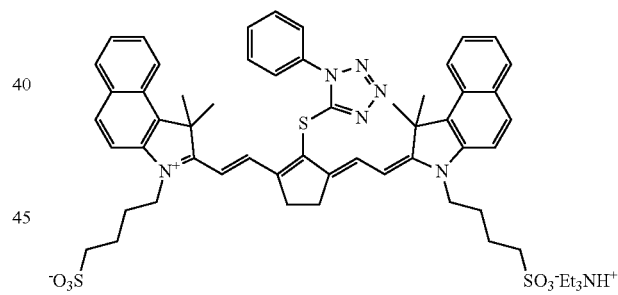

COMP IR-05, a 1 wt. % ethanol/water (1/1) solution of the following dye:

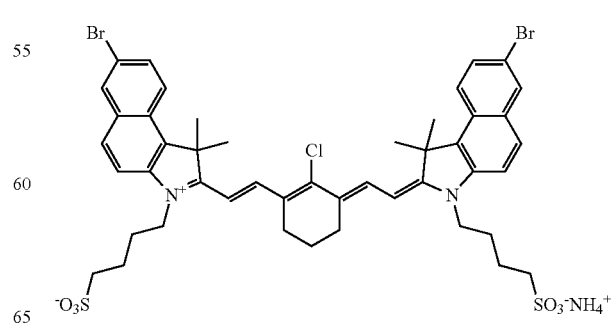

COMP IR-06, a 1 wt. ethanol/water (1/1) solution of the following dye:

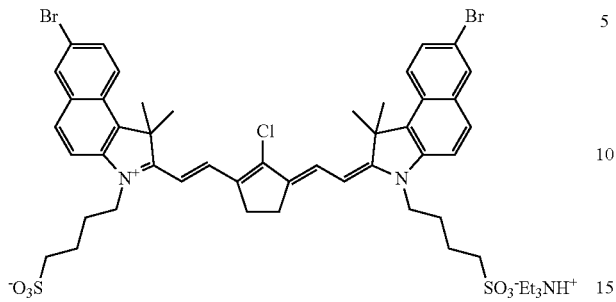

Preparation of the IR-Dyes

The IR-dyes may be prepared by well known synthesis methods. As an example, the preparation is given in detail for IR-05, IR-06 and IR-09. The other IR-dyes may be synthesised in an analogue manner.

Preparation of IR-05

IR-05 has been prepared according to scheme 1.

To a solution of INT-1 (19 g, prepared according to Z. Arnold, Collection of Czechoslovak Chemical Communications (1965)), 30(8), 2783-92) in dichloromethane (75 ml) at room temperature under stirring is added methyl triflate (12 ml) (exothermic reaction). After 30 minutes, methyl tertiary butyl ether (MTBE) (1000 ml) is added to precipitate INT-2. After filtration, the crude product is digested in MTBE (200 ml), filtered again and dried under vacuum at room temperature. Yield: 31 g (97%), yellow powder.

To a solution of INT-2 (31 g) in a mixture of acetic acid (40 ml) and methanol (60 ml) is added indoline (45 g). After stirring for 2 hours at room temperature, ethyl acetate (1000 ml) is added to the magenta colored suspension. After filtration, the crude INT-3 is digested in ethyl acetate (200 ml), filtered again and dried under vacuum at room temperature. Yield: 35.3 g (84%), greenish powder. Absorption maximum (methanol)=541 nm scheme 1

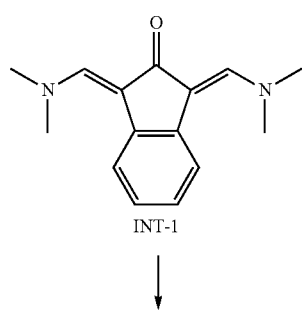

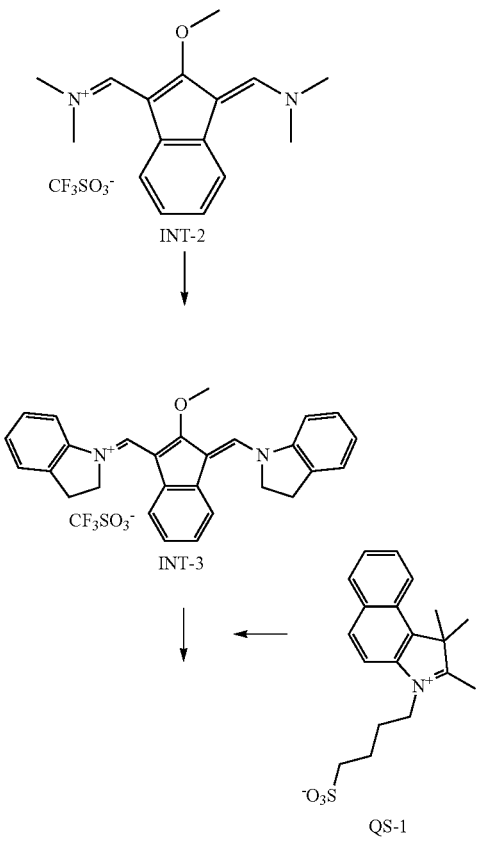

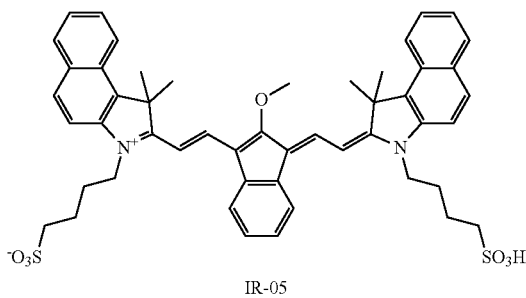

To a suspension of INT-3 (10 g) and QS-1 (12.4 g) in methanol (50 ml) at room temperature are added under stirring acetic acid anhydride (8.4 ml), acetic acid (2.58 ml) and triethylamine (5.0 ml) (slightly exothermic). After stirring for 3 hours at room temperature, methanesulfonic acid (3.5 ml) is added. Ethyl acetate containing 2% water (400 ml) is added, followed by an additional amount of water (5 ml). Crude IR-05 is isolated by filtration. Crude IR-05 is purified by dissolution in water (100 ml) containing triethylamine (2.5 ml), followed by consecutive addition of methanesulfonic acid (1.15 ml) and acetone (1000 ml). After filtration and drying under vacuum, pure IR-05 is obtained.

Yield: 7.37 g (43%), burgundy colored powder. Absorption maximum (methanol)=738 nm.

Preparation of intermediate INT-6

The intermediate INT-6 has been prepared according to scheme 2.

scheme 2

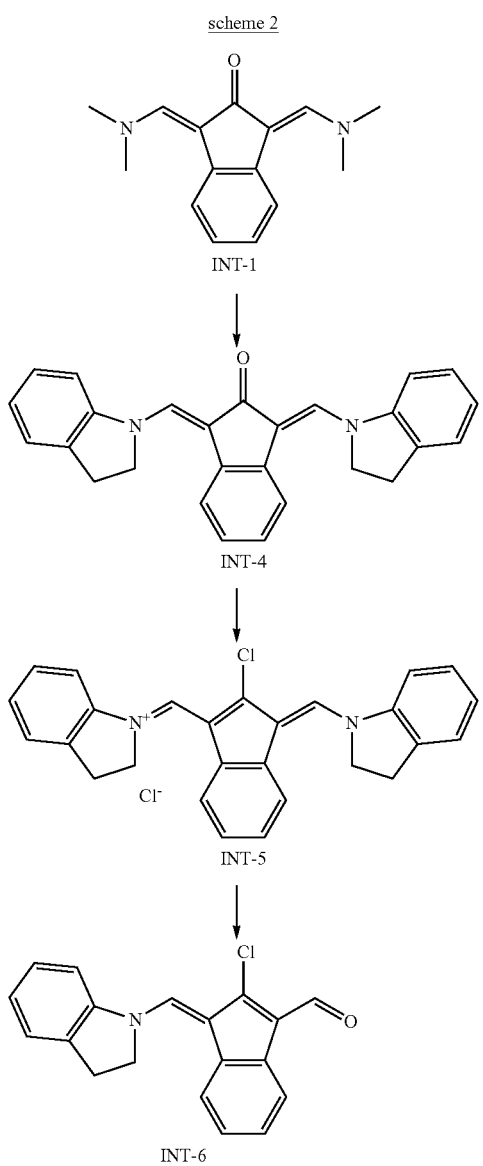

step) is isolated by filtration. Crude INT-5 is dissolved in a mixture of ethanol (500 ml) and water (50 ml). Under stirring at room temperature, triethylamine (20.8 ml) is added, followed by additional ethanol (500 ml).

After filtration and drying under vacuum, INT-6 is obtained. Yield: 23.5 g (77%), yellow powder. Absorption maximum (methanol)=434 nm.

Preparation of IR-06 and IR-09

IR-06 and IR-09 have been prepared according to scheme 3.

INT-6 (20 g) and QS-2 (55 g)(QS has been synthesized as described in EP-A 08 105 354.8 filed on 2008 Sep. 16) are suspended in a mixture of methanol (150 ml) and acetic acid anhydride (150 ml). Under stirring, the reaction mixture is warmed to 90° C. and acetic acid (2.8 ml) and triethylamine (18 ml) are added (exothermic reaction). After stirring for 3 hours at 90° C., the reaction mixture is cooled to room temperature and crystallization is induced by adding acetone (1500 ml) and water (50 ml). After filtration and drying under vacuum, IR-06 is obtained. Yield: 38 g (52%), green powder. Absorption maximum (methanol)=757 nm.

IR-06 (5.0 g) and benzene sulfinic acid (0.7 g) are suspended in acetonitrile (100 ml) under stirring at room temperature, followed by addition of triethylamine (0.92 ml). After 30 minutes, methanol (10 ml) is added and stirring is continued for 1 hour.

After filtration and drying under vacuum, IR-09 is obtained. Yield: 4.47 g (82%), green powder. Absorption maximum (methanol)=782 nm.

To a stirred solution of INT-1 (97 g, prepared according to Z. Arnold, Collection of Czechoslovak Chemical Communications (1965)), 30(8), 2783-92) in a mixture of acetic acid (96 ml) and methanol (144 ml) at room temperature is added indoline (143 g). A slightly exothermic reaction (40° C.) is observed. After stirring for 1 hour at 40° C., a mixture of methanol (25 ml) and water (25 ml) is added. Upon cooling to room temperature, a two phase system is observed. After decanting the supernatant phase, acetone (700 ml) is added and upon cooling (5° C.) the mixture, INT-4 crystallizes. After filtration and drying under vacuum, INT-4 is obtained. Yield: 140.1 g (89.5%), yellow powder. Absorption maximum (methanol)=422 nm.

INT-4 (39 g) is suspended in dry toluene (300 ml) and azeotropically dried by distillation at reduced pressure (rotary evaporator). Dried INT-4 is suspended in dry toluene (300 ml) and the reaction mixture is warmed to 80° C., resulting in a homogeneous solution. Under mechanical stirring, oxalyl chloride (9.4 ml) is added drop by drop. After stirring for 10 minutes at 80° C., the purple reaction mixture is cooled to room temperature and crude INT-5 (directly used in the next scheme 3

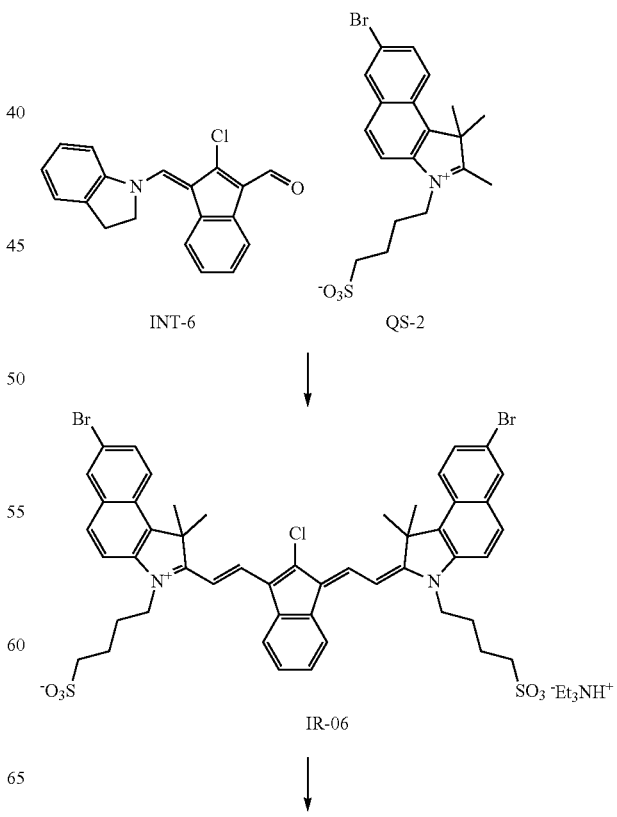

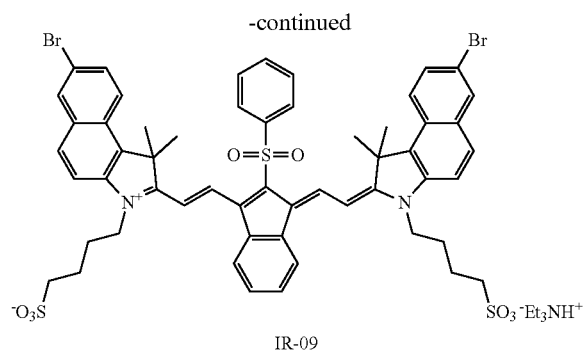

IR-09

Preparation Thermoplastic Particles LX-01

The polymer emulsion was prepared by means of a so-called "seeded emulsion polymerization" technique wherein part of the monomers, together with surfactant, are brought into the reactor before the initiator is added. All surfactant (2.15 wt. % relative to the total monomer amount) is present in the reactor before the reaction is started. 17.2 kg of a 10% Texapon K12 solution and 243.4 kg of demineralised water was added to a 400 l double-jacketed reactor. The reactor was put under inert atmosphere by 3 times vacuum/nitrogen exchanging and heated to 75° C. In another flask the monomer mixture was prepared by mixing 53.04 kg of styrene and 27.0 kg of acrylonitrile. 3.2 l of the monomer mixture was added to the reactor and stirred during 15 min. at 75° C. to homogeneously disperse the "seed" monomer fraction. Then 6.67 kg of a 2% aqueous solution of sodium persulphate was added (33% of the total initiator amount). After another 5 min. at 75° C., the reactor was heated up to 80° C. in 30 min. At 80° C., the monomer and initiator dosage was started. The monomer mixture (85 l) of acrylonitrile (26.0 kg) and styrene (51.2 kg) was added during 3 hours. Simultaneously with the monomer addition, an aqueous persulphate solution was added (13.33 kg of a 2% aqueous $Na_2S_2O_8$ solution) while keeping the reactor at 80° C. Since the reaction is slightly exothermic the reactor jacket was cooled until 74° C., in order to keep the reactor temperature at 80° C. Upon completion of the monomer dosage, the reactor temperature was set to 82° C. and stirred during 30 min. To reduce the amount of residual monomer a redox-initiation system was added: 340 g sodium formaldehyde sulphoxylate dihydrate (SFS) dissolved in 22.81 kg water and 570 g of a 70 wt. % t-butyl hydro peroxide (TBHP) diluted with 4.8 kg of water. The aqueous solutions of SFS and TBHP were added separately during 2 hours and 20 min. The reaction was then heated for another 10 min. at 82° C. followed by cooling to 20° C. 760 g of Proxel Ultra5 was added as biocide and the latex was filtered using a 5 micron filter.

This resulted in the latex dispersion LX-01 with a solid content of 20.68 wt. % and a pH of 3.25.

Two techniques were used to measure the particle diameter of the hydrophobic thermoplastic particles in latex LX-01. $Ø_{PCS}$ is the particle diameter obtained by Photon Correlation Spectroscopy. The measurements were performed according the ISO 13321 procedure (first edition, 1996 Jul. 1) with a Brookhaven BI-90 analyzer from Brookhaven Instrument Company, Holtsville, N.Y., USA. $Ø_V$ is the volume average particle diameter obtained with hydrodynamic fractionation obtained with a PL-PSDA apparatus (Polymer Laboratories Particle Size Diameter Analyzer) from Polymeric Labs.

The resulting values are given in Table 1.

Preparation Thermoplastic Particles LX-02

The polymer emulsion was prepared by means of a seeded emulsion polymerisation using styrene and acrylonitrile as monomers. All surfactant (4.5% towards the total monomer amount) was present in the reactor before any monomer was added. In a double-jacketed reactor of 2 liter, 10.35 g of Chemfac PB-133, 1.65 g of $NaHCO_3$ and 1482.1 g of demineralised water was added. The reactor was flushed with nitrogen and heated until 75° C. When the reactor content reached a temperature of 75° C., 1.5% of the monomers were added (i.e. a mixture of 2.29 g styrene and 1.16 g acrylonitrile). The monomers were emulsified during 15 minutes at 75° C. followed by the addition of 37.95 gram of a 2% solution of sodium persulfate in water. The reactor was subsequently heated to a temperature of 80° C. during 30 minutes. Then, the remaining monomer mixture (150.1 g of styrene and 76.5 g of acrylonitrile) was dosed to the reaction mixture during 180 minutes. Simultaneously with the monomer addition, an additional amount of an aqueous persulfate solution was added (37.95 g. of a 2% aqueous $Na_2S_2O_8$ solution). After the monomer addition was completed, the reactor was heated for 60 minutes at 80° C. To reduce the amount of residual monomer a vacuum distillation was performed at 80° C. during 1 hour. The reactor was subsequently cooled to room temperature, 100 ppm Proxel Ultra 5 was added as biocide and the latex was filtered using coarse filter paper.

This resulted in a latex dispersion LX-02 with a solid content of 13.14% and a pH of 6.10. The average particle size is given in table 1.

The average particle size was 29 nm as measured using PL-PSDA (Polymer Laboratories Particle Size Diameter Analyser). Measured with BI-90 this resulted in a mean particle size of 31 nm.

TABLE 1

|  | LX-01 | LX-02 |
| --- | --- | --- |
| $Ø_{PCS}$ (nm) | 59 | 31 |
| $Ø_V$ (nm) | 53 | 29 |

Preparation of the aluminum substrate AS-01.

A 0.3 mm thick aluminum foil was degreased by spraying with an aqueous solution containing 34 g/l NaOH at 70° C. for 6 seconds and rinsed with demineralised water for 3.6 seconds. The foil was then electrochemically grained during 8 seconds using an alternating current in an aqueous solution containing 15 g/l HCl, 15 g/l $SO_4^{2-}$ ions and 5 g/l $Al^{3+}$ ions at a temperature of 37° C. and a current density of about 100 $A/dm^2$ (charge density of about 800° $C./dm^2$). Afterwards, the aluminum foil was desmutted by etching with an aqueous solution containing 145 g/l of sulphuric acid at 80° C. for 5 seconds and rinsed with demineralised water for 4 seconds. The foil was subsequently subjected to anodic oxidation during 10 seconds in an aqueous solution containing 145 g/l of sulphuric acid at a temperature of 57° C. and a current density of 33 $A/dm^2$ (charge density of 330 $C/dm^2$), then washed with demineralised water for 7 seconds and post-treated for 4 seconds (by spray) with a solution containing 2.2 g/l PVPA at 70° C., rinsed with demineralised water for 3.5 seconds and dried at 120° C. for 7 seconds.

The support thus obtained is characterised by a surface roughness Ra of 0.35-0.4 μm (measured with interferometer NT1100) and an anodic weight of about 4.0 $g/m^2$.

Example 1

Preparation of the Printing Plate Precursors PPP-01 and PPP-02

The coating solutions of the printing plate precursors PPP-01 and PPP-02 were prepared using the materials as described above. The IR-dyes were added as 1 wt. % solutions in water/ethanol (1/1). The pH of the coating solution was adjusted to 3.6 with a diluted ammonia solution (ca. 3 wt. %). The coating solutions were coated on the aluminum substrate AS-01 with a coating knife at a wet thickness of 30 μm. After drying at 50° C. for 1 minute in a hot air oven, the printing plate precursors PPP-01 and PPP-02, of which the dry coating weight of the different components is given in Table 2, were obtained. The dry coating weights used in Table 2 refer to the weight of the ingredients as such and not to the weight of the solutions or dispersions of the ingredients, i.e. those mentioned in the material list above, used to prepare the precursors.

TABLE 2

| Ingredients (g/m²) | PPP-01 (COMP) | PPP-02 (INV) |
|---|---|---|
| Latex LX-01 | 0.6927 | 0.6927 |
| COMP IR-01 | 0.0976 | — |
| IR-01 | — | 0.1150 |
| Binder-01 | 0.0900 | 0.0900 |
| Surfactant | 0.0075 | 0.0075 |
| Total | 0.8878 | 0.9052 |

Daylight Stability Test.

Both printing plate precursors PPP-01 and PPP-02 were subsequently exposed during respectively 2, 4, 8, 16 and 24 hours to light from a light tube (Aura Universal Long Live Lights 58 W-840) at a distance of about 2 m from the precursor. The light intensity at the surface of the precursor amounted to about 750-770 Lux (as measured with a SkyTronic digital Lux meter).

After the indicated exposure times, the diffuse reflection spectrum (DRS) of both precursors was measured with a Shimadzu UV-3101PC spectrophotometer, equipped with a ISR-3100 integration sphere. The diffuse reflection spectrum was measured from 200 nm to 1200 nm (speed="fast", modus="absorbance A", slit width="30", data interval="1 nm").

The DRS spectra of both PPP-01 and PPP-02 after the indicated exposure times are shown in FIGS. 1 and 2. From that FIG. 1 it is clear that the DRS spectrum of PPP-01, after exposure to daylight, undergoes major changes. These changes are the result of a chemical transformation (oxydation) of the IR-dye COMP IR-01 under the influence of daylight. It is clear that the original maximum absorption in the IR region almost completely disappears, while a new absorption peak in the visible region appears. The first phenomenon may give rise to a decreased sensitivity of the precursor, due to less absorption of the radiation used to image the precursor (IR radiation), while the second phenomenon may give rise to a change of colour of the printing plate precursor.

From FIG. 2 it is clear that the DRS spectrum of PPP-02, compared to this of PPP-01, does not change substantially upon exposure to daylight. This will result in more consistent lithographic properties for PPP-02 upon storage in daylight conditions.

Example 2

Preparation of the Printing Plate Precursors PPP-03 to PPP-14

The coating solutions of the printing plate precursors PPP-03 to PPP-14 were prepared using the materials as described above. The IR-dyes were added as 1 wt. % solutions in water/ethanol (1/1). The pH of the coating solution was adjusted to 4.1 with a diluted ammonia solution (ca. 3 wt. %). The coating solutions were coated on the aluminum substrate AS-01 with a coating knife at a wet thickness of 30 μm. After drying at 60° C., the printing plate precursors PPP-03 to PPP-14, of which the dry coating weight of the different components is given in Table 3, were obtained. The dry coating weights used in Table 3 refer to the weight of the ingredients as such and not to the weight of the solutions or dispersions of the ingredients, i.e. those mentioned in the material list above, used to prepare the precursors.

TABLE 3

| Ingredients (g/m²) | PPP-03 (COMP) | PPP-04 (INV) | PPP-05 (INV) | PPP-06 (INV) |
|---|---|---|---|---|
| Latex LX-02 | 0.3993 | 0.3993 | 0.3993 | 0.3993 |
| COMP IR-02 | 0.0551 | — | — | — |
| IR-02 | — | 0.0562 | — | — |
| IR-03 | — | — | 0.0720 | — |
| IR-04 | — | — | — | 0.0610 |
| Pigment | 0.0200 | 0.0200 | 0.0200 | 0.0200 |
| Dye | 0.0090 | 0.0090 | 0.0090 | 0.0090 |
| Binder | 0.0261 | 0.0261 | 0.0261 | 0.0261 |
| HEDP | 0.0150 | 0.0150 | 0.0150 | 0.0150 |
| Surfactant | 0.0050 | 0.0050 | 0.0050 | 0.0050 |
| Total | 0.5295 | 0.5306 | 0.5464 | 0.5354 |

| Ingredients (g/m²) | PPP-07 (COMP) | PPP-08 (COMP) | PPP-09 (COMP) | PPP-10 (INV) |
|---|---|---|---|---|
| Latex LX-02 | 0.3993 | 0.3993 | 0.3993 | 0.3993 |
| COMP IR-03 | 0.0596 | — | — | — |
| COMP IR-04 | — | 0.0689 | — | — |
| COMP IR-05 | — | — | 0.0654 | — |
| IR-05 | — | — | — | 0.0728 |
| Pigment | 0.0200 | 0.0200 | 0.0200 | 0.0200 |
| Dye | 0.0090 | 0.0090 | 0.0090 | 0.0090 |
| Binder | 0.0261 | 0.0261 | 0.0261 | 0.0261 |
| HEDP | 0.0150 | 0.0150 | 0.0150 | 0.0150 |
| Surfactant | 0.0050 | 0.0050 | 0.0050 | 0.0050 |
| Total | 0.5340 | 0.5433 | 0.5398 | 0.5472 |

| Ingredients (g/m²) | PPP-11 (INV) | PPP-12 (INV) | PPP-13 (INV) | PPP-14 (COMP) |
|---|---|---|---|---|
| Latex LX-02 | 0.3993 | 0.3993 | 0.3993 | 0.3993 |
| IR-06 | 0.0731 | — | — | — |
| IR-08 | — | 0.0713 | — | — |
| IR-09 | — | — | 0.0800 | — |
| COMP IR-06 | — | — | — | 0.0699 |
| Pigment | 0.0200 | 0.0200 | 0.0200 | 0.0200 |
| Dye | 0.0090 | 0.0090 | 0.0090 | 0.0090 |
| Binder | 0.0261 | 0.0261 | 0.0261 | 0.0261 |
| HEDP | 0.0150 | 0.0150 | 0.0150 | 0.0150 |
| Surfactant | 0.0050 | 0.0050 | 0.0050 | 0.0050 |
| Total | 0.5475 | 0.5457 | 0.5544 | 0.5443 |

Daylight Stability Test

The printing plate precursors PPP-03 to PPP-14 were submitted to the daylight stability tests as outlined in example 1. Also the DRS spectra were measured as described above in example 1. As an example, the spectra of PPP-09, PPP-14, PPP-12 and PPP-11 are shown in respectively FIGS. 2 to 6.

From those Figures it is clear that for the comparative examples PPP-09 and PPP-14 (FIGS. 3 and 4) a substantial alteration of the DRS spectrum is observed under the influence of daylight. On the other hand, the DRS spectrum of the inventive examples PPP-12 and PPP-11 (FIGS. 5 and 6) do not change, even after the longest exposure times. This clearly illustrates that the stability of the precursors containing the inventive IR-dyes towards daylight is substantially improved.

Lithographic Evaluation

The printing plate precursors PPP-03 to PPP-014 were exposed at an addressability of 2400 dpi on a Creo TrendSetter 3244T (40 W head) IR-laser platesetter and this at respectively 210-180-150-120-90 mJ/cm² at 150 rotations per minute (rpm). At each exposure density value (mJ/cm²) both a set of 200 lines per inch (lpi) Agfa Balanced Screening (ABS) screen patches (with nominal dot areas from 1% to 99%) and a set of Agfa CristalRaster (ACR) screen patches (with nominal dot areas from 1% to 99%) were exposed on the printing plate precursor. The nominal elementary microdot size of Agfa CristalRaster (ACR) screening at 2400 dpi is 20 μm.

After exposure the printing plate precursors were developed in a VA88 processor (from Agfa Graphics NV) with TD1000 developer (from Agfa Graphics NV) at 22° C. in the developer section and a 1:1 diluted RC795 gum solution (from Agfa Graphics NV) at 22° C. in the gumming section. The development speed amounted to 1.2 m/min.

After development and gumming the printing plates were mounted on a Heidelberg GTO52 printing press equipped with a Kompac III dampening system. A compressible blanket was used and printing was done with the fountain solution 4% Agfa Prima FS4014 (trademark of Agfa Graphics) and K+E 800 black ink (trademark of K&E). The following startup procedure was used: first 5 revolutions with the dampening form rollers engaged, then 5 revolutions with both the dampening and ink form rollers engaged, then printing started. 1 000 prints were made on 80 g/m² offset paper.

Sensitivity

The sensitivity of the precursors was evaluated by determining the lowest exposure energy density (mJ/cm²) at which 2% 200 lpi ABS dots are perfectly visible (by means of a 5× magnifying glass) on printed sheet 1 000.

Effect of Daylight Exposure on Lithographic Performance

A daylight stability evaluation was performed by exposing the precursors, prior to imagewise exposure and development, during respectively 2, 4, 8, 12, 16 and 24 hours to light from 2 fluorescent tubes of 58 W at a distance of 1.80 m from the precursors (ceiling): 1× Philips Fluorescent Tube 58 W 840 Cool White and 1× Philips Fluorescent Tube 58 W 830 Warm White. Additionally 2 halogen light bulbs of 1000 W (Philips R7S 1000 W 189 mm R7S) in uplighters were positioned at a distance of 0.40 m from the ceiling in a way that their light only reached the plate precursor in an indirect way (reflection from the white ceiling). The light intensity at the surface of the precursor amounted to about 1300 Lux (as measured with a SkyTronic digital Lux meter).

The evaluation was carried out using the following two printing performance parameters:

Density of the non-image areas on printed sheet 250 (D (non-image, printed sheet)).

Dot area of the 40% ACR patch on the printing plate upon exposure (180 mJ/cm²) and development (Dot area (40% ACR, plate)).

The density of the non-image areas on printed sheet 250 and the dot area of the 40% ACR patch on the printing plate referred to above were all measured with a Gretag MacBeth densitometer type D19C.

In Table 4 the results of D (non-image, printed sheet) and Dot area (40% ACR, plate) are given for all tested printing plate precursors after storage during 24 hours under daylight prior to imagewise exposure and development.

TABLE 4

|  | D (non-image, printed sheet) | Dot area (40% ACR, plate) | Sensitivity (mJ/cm²) |
|---|---|---|---|
| PPP-03 (COMP) | 1.1 | 1 | 120 |
| PPP-04 (INV) | 0.4 | 51 | 120-150 |
| PPP-05 (INV) | 0.1 | 55 | 120 |
| PPP-06 (INV) | 0.3 | 55 | 120 |
| PPP-07 (COMP) | 1.1 | 4 | 120 |
| PPP-08 (COMP) | 1.0 | 12 | 120 |
| PPP-09 (COMP) | 1.1 | 20 | 120 |
| PPP-10 (INV) | 0.01 | 39 | 150 |
| PPP-11 (INV) | 0 | 56 | 120 |
| PPP-12 (INV) | 0.2 | 55 | 90 |
| PPP-13 (INV) | 0 | 55 | 120 |
| PPP-14 (COMP) | 1.1 | 25 | 120 |

From Table 4 it is clear that the printing plate precursors according to the comparative examples, after storage for 24 hours to daylight, have a higher density in the non-image areas on printed sheet 250 as compared to all printing plate precursors according to the inventive examples. This indicates that the printing plate precursors according to the inventive examples have a better clean-out. The improved clean-out, i.e. removal of the non-image areas during development, may be due to the fact that less IR-dye is detoriated during storage under daylight. A better coverage of the latex particles by the IR-dye may improve the removal of the particles during development.

From Table 4 it is also clear that the printing plate precursors according to the comparative examples, after storage for 24 hours to daylight, have a lower sensitivity as is clear from the lower dot value of the 40% ACR patch on the plate, as compared to all printing plate precursors according to the inventive examples. Again, this higher sensitivity of the printing plate precursors according to the inventive examples may be the result of less detoriation of the IR-dye during storage under daylight. Without exposure to daylight all printing plate precursors have a dot area (40% ACR, plate) value of 56%.

From Table 4 it is also clear that all printing plate precursors according to the inventive examples have a sensitivity on the plate (without exposure to daylight) which is comparable, or even higher, as compared to the printing plate precursors according to the comparative examples.

The invention claimed is:

1. A lithographic printing plate precursor comprising a coating provided on a support having a hydrophilic surface, the coating containing thermoplastic polymer particles and an IR-dye, wherein the IR-dye contains a structural element according to Formula I,

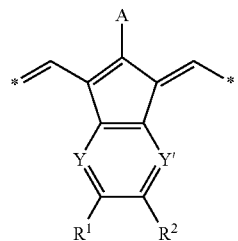

Formula I wherein

A represents a hydrogen, an optionally substituted alkyl, aralkyl or aryl group, halogen, —$OR^c$, —$SR^d$, —$NR^fR^g$, —$NR^h(SO_2R^i)$ or —$NR^j(CO_2R^k)$ wherein $R^c$ represents an optionally substituted aryl group, $R^d$ represents an optionally substituted alkyl, aralkyl, aryl or heteroaryl group, $R^f$ represents an optionally substituted alkyl, aralkyl or aryl group, $R^g$ represents an optionally substituted aryl group, $R^h$ represents an optionally substituted alkyl or aryl group, $R^i$ represents an optionally substituted alkyl or aryl group or —$NR^{i1}R^{i2}$ wherein $R^{i1}$ and $R^{i2}$ represent hydrogen, an optionally substituted alkyl or aryl group, $R^j$ represents an optionally substituted alkyl or aryl group and $R^k$ represents an optionally substituted alkyl group;

Y and Y' independently represent —CH— or —N—;

$R^1$ and $R^2$ independently represent hydrogen, an optionally substituted alkyl or aryl group or represent the necessary atoms to form a ring; and \* represent the linking positions to the rest of the molecule.

2. The lithographic printing plate precursor according to claim 1, wherein the IR-dye has a structure according to Formula II, Formula II wherein A, Y, Y', $R^1$ and $R^2$ have the same meaning as in Formula I;

T and T' independently represent hydrogen, alkyl, halogen, alkoxy, cyano, —$CO_2R^k$, —$CONR^lR^m$, —$SO_2R^n$, —$SO_2NR^oR^p$) or an optionally substituted annulated benzo ring wherein $R^l$, $R^m$ represent hydrogen, an optionally substituted alkyl or aryl group, $R^n$ represents an optionally substituted alkyl or aryl group and $R^o$ and $R^p$ represent hydrogen, an optionally substituted alkyl or aryl group;

$R^k$, R and R' independently represent an optionally substituted alkyl group;

Z and Z' independently represent —S—, —CH=CH— or —$CR^aR^b$—; and $R^a$ and $R^h$ represent an optionally substituted alkyl, aralkyl or aryl group.

3. The lithographic printing plate precursor according to claim 2, wherein the IR-dye has a structure according to Formula III, Formula III wherein A, T, T', Y, Y', $R^1$, $R^2$, $R^a$ and $R^b$ have the same meaning as in Formula II;

X and X' independently represent O, S or —$CH_2$—;

n and n' are integers ranging from 0 to 3;

$M^+$ represents a monovalent cation.

4. The lithographic printing plate precursor according to claim 1, wherein the IR-dye has a structure according to Formula IV, Formula IV wherein A, Y, Y', $R^1$ and $R^2$ have the same meaning as in Formula I, X and X' independently represent O, S or —$CH_2$—;

n and n' are integers ranging from 0 to 3;

$R^7$ represents hydrogen, halogen, alkyl or alkoxy group; and $M^+$ represents a monovalent cation.

5. The lithographic printing plate precursor according to claim 3, wherein the IR-dye has a structure according to Formula V, Formula V wherein X, n, A and $M^+$ have the same meaning as in Formula III; and $R^8$ represents hydrogen or Br.

6. The lithographic printing plate precursor according to claim 5, wherein the IR-dye has a structure according to Formula VI,

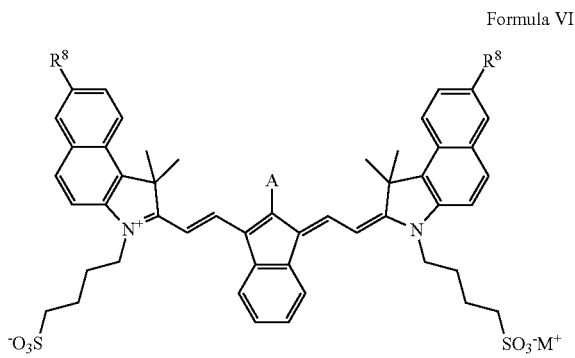

Formula VI wherein
R⁸, A and M⁺ have the same meaning as in Formula V.

7. The lithographic printing plate precursor according to claim 4, wherein the IR-dye has a structure according to Formula VII,

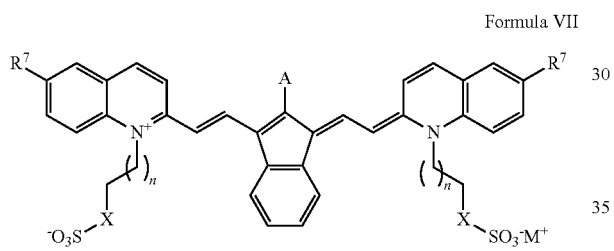

Formula VII wherein
A, X, R⁷ and n have the same meaning as in Formula IV.

8. The lithographic printing plate precursor according to claim 7, wherein the IR-dye has a structure according to Formula VIII,

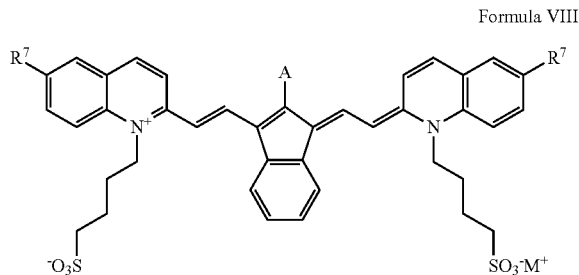

Formula VIII wherein
R⁷, A and M⁺ have the same meaning as in Formula IV.

9. The lithographic printing plate precursor according claim 1, wherein A represents H, Cl, —SR$^d$, —NR$^f$R$^g$, —NR$^h$(SO₂R$^i$) or —NR$^j$(CO₂R$^k$), and R$^d$ represents an optionally substituted alkyl, aralkyl, aryl or heteroaryl group, R$^f$ represents an optionally substituted alkyl, aralkyl or aryl group, R$^g$ represents an optionally substituted aryl group, R$^h$ represents an optionally substituted alkyl or aryl group, R$^i$ represents an optionally substituted alkyl or aryl group or —NR$^{i1}$R$^{i2}$ wherein R$^{i1}$ and R$^{i2}$ represent hydrogen, an optionally substituted alkyl or aryl group, R$^j$ represents an optionally substituted alkyl or aryl group and R$^k$ represents an optionally substituted alkyl group.

10. The lithographic printing plate precursor according to claim 1, wherein A represents —NR$^h$(SO₂R$^i$) or —NR$^j$(CO₂R$^k$) and R$^h$ represents an optionally substituted alkyl or aryl group, R$^i$ represents an optionally substituted alkyl or aryl group or —NR$^{i1}$R$^{i2}$ wherein R$^{i1}$ and R$^{i2}$ represent hydrogen, an optionally substituted alkyl or aryl group, R$^j$ represents an optionally substituted alkyl or aryl group and R$^k$ represents an optionally substituted alkyl group.

11. The lithographic printing plate according to claim 1, wherein A is selected from:

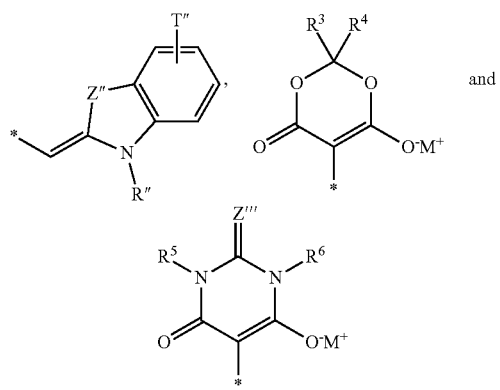

wherein
Z″ represents —S—, —CH═CH— or —CR$^a$R$^b$—;
R$^a$ and R$^b$ represent an optionally substituted alkyl, aralkyl or aryl group;
Z‴ represents O or S;
R″ represents an optionally substituted alkyl group;
T″ represents hydrogen, alkyl, halogen, alkoxy, cyano, —CO₂R$^k$, —CONR$^l$R$^m$, —SO₂R″, —SO₂NR$^o$R$^p$ or an optionally substituted annulated benzo ring wherein R$^l$, R$^m$ represent hydrogen, an optionally substituted alkyl or aryl group, R″ represents an optionally substituted alkyl or aryl group and R$^o$ and R$^p$ represent hydrogen, an optionally substituted alkyl or aryl group;
R³, R⁴, R⁵ and R⁶ independently represent an optionally substituted alkyl, aralkyl or aryl group;
M⁺ represent a monovalent cation; and
* represents the linking position to the rest of the molecule.

12. The lithographic printing plate precursor according to claim 1, wherein the thermoplastic particles have an average particle diameter of from 25 to 50 nm.

13. A method of preparing a lithographic printing plate comprising the steps of:
exposing a lithographic printing plate precursor as defined in claim 1 to IR radiation; and
developing the exposed precursor.

14. The method according to claim 13, wherein the developing step is carried out off press in an automated processing unit comprising rotating brushes.

15. The method according to claim 13, wherein the developing step is carried out on press.

* * * * *